United States Patent
Park et al.

(10) Patent No.: US 9,998,582 B2
(45) Date of Patent: Jun. 12, 2018

(54) PERIPHERAL DEVICE MANAGEMENT SYSTEM FOR COMMUNICATION BETWEEN A DISPLAY APPARATUS AND A NODE TERMINAL APPARATUS

(71) Applicant: SAMSUNG ELECTRONICS CO., LTD., Suwon-si (KR)

(72) Inventors: Sung-woo Park, Seoul (KR); Sang-jun Lee, Yongin-si (KR); Jee-hoon Ka, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days. days.

(21) Appl. No.: 15/019,017

(22) Filed: Feb. 9, 2016

(65) Prior Publication Data

US 2016/0381201 A1 Dec. 29, 2016

(30) Foreign Application Priority Data

Jun. 26, 2015 (KR) .................. 10-2015-0090978

(51) Int. Cl.
*H04B 1/38* (2015.01)
*H04M 1/725* (2006.01)

(52) U.S. Cl.
CPC ......... *H04M 1/72533* (2013.01); *H04W 4/70* (2018.02)

(58) Field of Classification Search
CPC ............. H04L 12/2807; H04L 12/2818; H04L 12/2834; H04L 41/22; H04L 41/0853; H04L 67/2842; H02J 3/14; H02J 13/0006; H02J 13/00; G06F 19/3481
See application file for complete search history.

(56) References Cited

U.S. PATENT DOCUMENTS

| | | |
|---|---|---|
| 2003/0076341 A1 | 4/2003 | Kuki |
| 2004/0203387 A1 | 10/2004 | Grannan |
| 2005/0088276 A1 | 4/2005 | Lee et al. |
| 2005/0101312 A1 | 5/2005 | Kang |
| 2008/0130520 A1* | 6/2008 | Ebrom ............ G06F 9/54 370/254 |
| 2011/0037712 A1 | 2/2011 | Kim et al. |
| 2012/0109384 A1 | 5/2012 | Stepanian |

(Continued)

OTHER PUBLICATIONS

Communication dated Jun. 17, 2016, issued by the International Searching Authority in counterpart International Application No. PCT/KR2016/001067 (PCT/ISA/210 & PCT/ISA/237).

(Continued)

*Primary Examiner* — Idowu O Osifade
(74) *Attorney, Agent, or Firm* — Sughrue Mion, PLLC

(57) ABSTRACT

A peripheral device management system includes a node terminal apparatus attached to a peripheral device and configured to detect an operating state of the attached peripheral device through a sensor configured to generate sensing data, and a display apparatus configured to receive the sensing data from the node terminal apparatus, to determine the operating state of the peripheral device based on the sensing data, and to display a user interface (UI) containing the operating state of the peripheral device. Accordingly, the peripheral device management system provides an Internet of things (IOT) service to a peripheral device that may not be capable of supporting an IOT service.

22 Claims, 17 Drawing Sheets

(56) References Cited

U.S. PATENT DOCUMENTS

| | | | |
|---|---|---|---|
| 2012/0173177 A1* | 7/2012 | Nishiyama | H02J 13/0017 |
| | | | 702/62 |
| 2014/0005809 A1 | 1/2014 | Frei et al. | |
| 2014/0273847 A1 | 9/2014 | Nixon et al. | |
| 2015/0120000 A1 | 4/2015 | Coffey et al. | |
| 2016/0226732 A1* | 8/2016 | Kim | H04L 12/2807 |
| 2016/0370833 A1* | 12/2016 | Lu | G06F 1/266 |

OTHER PUBLICATIONS

ITU, "Common requirements and capabilities of a gateway for Internet of Things applications", ITU-T, International Telecommunication Union, n. Y.2067 (Jun. 2014), Jun. 6, 2014, pp. 1-21, Geneva, CH, XP044008597.

Communication dated Nov. 9, 2016 issued by the European Patent Office in counterpart European Patent Application No. 16156723.5.

* cited by examiner

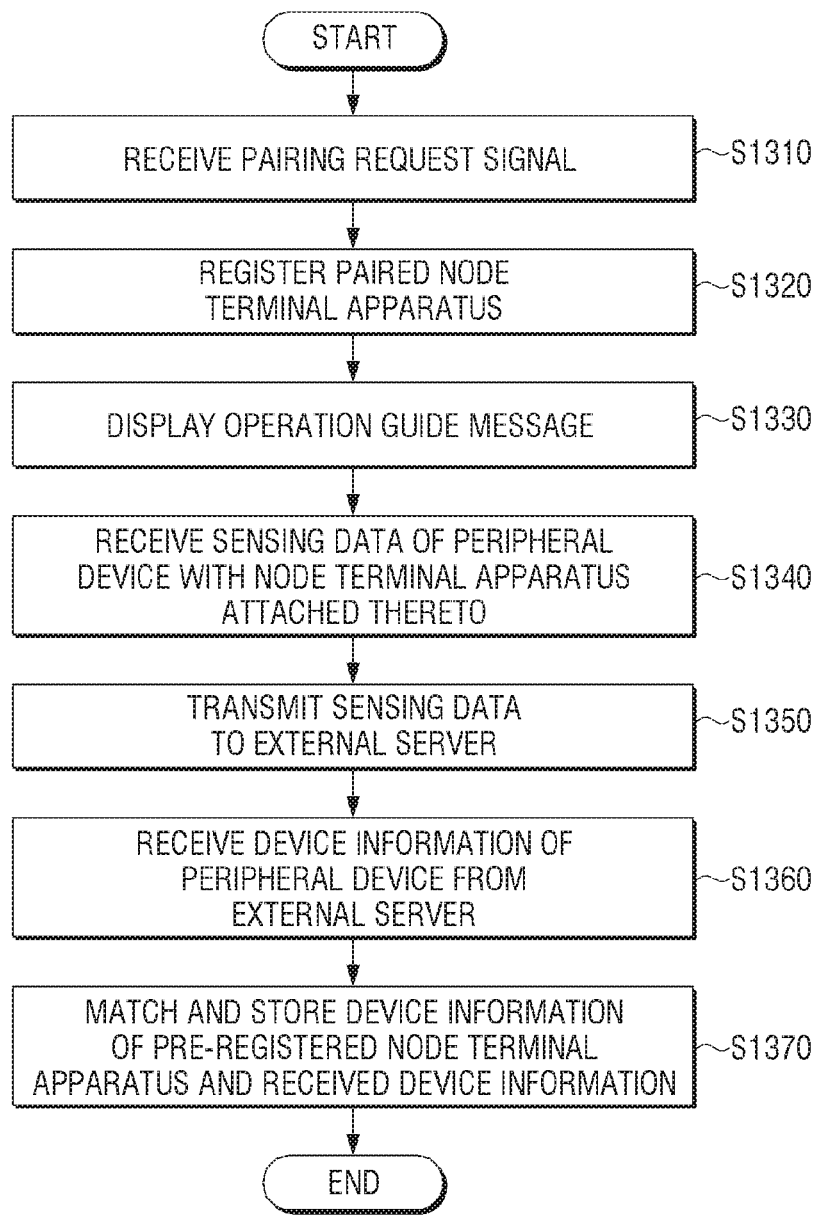

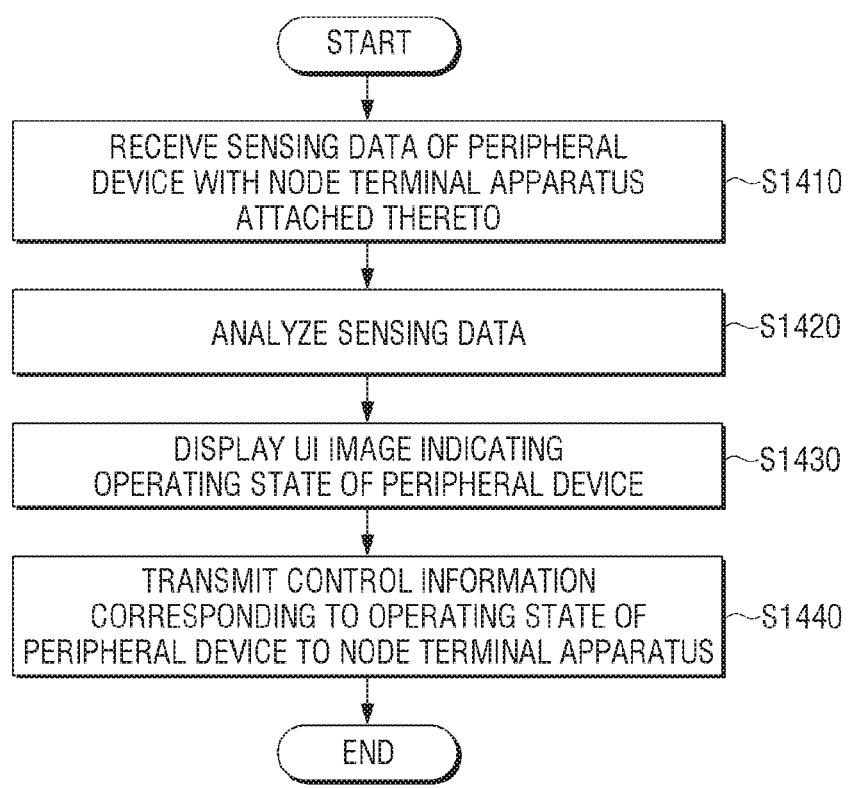

PERIPHERAL DEVICE MANAGEMENT SYSTEM FOR COMMUNICATION BETWEEN A DISPLAY APPARATUS AND A NODE TERMINAL APPARATUS

CROSS-REFERENCE TO RELATED APPLICATIONS

This application claims priority from Korean Patent Application No. 10-2015-0090978, filed on Jun. 26, 2015, in the Korean Intellectual Property Office, the disclosure of which is incorporated herein by reference in its entirety.

BACKGROUND

Field

Apparatuses and methods consistent with exemplary embodiments relate to a node terminal apparatus, a display apparatus, a peripheral device management system including the node terminal apparatus and the display apparatus, and a method thereof, for providing an Internet of things (IOT) service.

Description of Related Art

Due to the development of the Internet, an Internet of things (IOT) service for transmitting and receiving signals between electronic devices via wired and wireless Internet has been developed. Accordingly, modern electronic devices support a communication module, platform, and service functions for the IOT service and are capable of sharing information between electronic devices.

However, electronic devices that do not support a communication module, platform, and service functions for the IOT service, i.e., older electronic devices may not be capable of using the IOT service.

To use an IOT service through a modern electronic device that is capable of supporting the IOT service, protocols for the IOT service between electronic devices should correspond to each other. If electronic devices that are capable of supporting the IOT service do not have compatible platforms installed, the IOT service between electronic devices may not be provided.

SUMMARY

Exemplary embodiments may overcome the above disadvantages and other disadvantages not described above. Also, exemplary embodiments are not required to overcome the disadvantages described above, and an exemplary embodiment may not overcome any of the problems described above.

One or more exemplary embodiments provide an Internet of things (IOT) service by an electronic device that may not be capable of providing the IOT service.

According to an aspect of an exemplary embodiment, there is provided a peripheral device management system including a node terminal apparatus attached to a peripheral device and configured to detect an operating state of the attached peripheral device through a sensor to generate sensing data, and a display apparatus configured to receive the sensing data from the node terminal apparatus, to determine the operating state of the peripheral device based on the sensing data, and to display a user interface (UI) containing the operating state of the peripheral device.

The display apparatus may perform pairing with the node terminal apparatus according to pairing request of the node terminal apparatus and, in response to the sensing data of the peripheral device being received from the paired node terminal apparatus, may transmit the received sensing data to an external server, receives device information of the peripheral device from the external server, and registers the peripheral device.

The UI may be a peripheral device UI including a UI element corresponding to at least one peripheral device, and the display apparatus may add a UI element corresponding to a peripheral device registered in the display apparatus to the peripheral device UI and display the peripheral device UI, and may add a UI element corresponding to the registered peripheral device to the peripheral device UI and display the peripheral device UI based on a position and determined distance of the UI element.

The display apparatus may determine a position of the UI element corresponding to the peripheral device registered in the peripheral device UI according to a user command and determine a relative distance of the UI element of the peripheral device registered in the peripheral device UI based on signal intensity of the node terminal apparatus attached to the registered peripheral device.

The display apparatus may display an operating state of the peripheral device on a UI element corresponding to a peripheral device with the node terminal apparatus attached thereto.

The display apparatus may display the operating state of the peripheral device on the UI element corresponding to the peripheral device with the node terminal apparatus attached thereto with an animation effect or display the operating state in the form of message popup around the UI element corresponding to the peripheral device with the node terminal apparatus attached thereto.

The UI may be a message UI for guiding an operating state of a peripheral device with the node terminal apparatus attached thereto, and in response to the sensing data being received from the node terminal apparatus during display of image content, the display apparatus may display the message UI for guiding the operating state determined based on the received sensing data on the image content.

The message UI may be displayed in the form of popup in a region for displaying a UI element corresponding to a peripheral device with the node terminal apparatus attached thereto from regions for displaying the image content.

The display apparatus may determine a position of a user terminal apparatus communicable with the display apparatus on the peripheral device UI, change a peripheral device UI including a UI element corresponding to the at least one peripheral device to correspond to a screen of the user terminal apparatus based on the determined position of the user terminal apparatus and a direction in which the user terminal apparatus is directed, and transmit the peripheral device UI to the user terminal apparatus.

The node terminal apparatus may be attachable and detachable to and from a surface of the peripheral device and may sense at least one of vibration feedback generated according to an operating state of the peripheral device and event notification feedback to generate sensing data upon being attached to the surface of the peripheral device.

The display apparatus may transmit control information corresponding to the operating state of the peripheral device determined based on the sensing data to the node terminal apparatus, and the node terminal apparatus may control an operation of a peripheral device with the node terminal apparatus attached thereto based on the control information received from the display apparatus.

According to an aspect of another exemplary embodiment, there is provided a method for managing a peripheral device in a peripheral device management system including a node terminal apparatus and a display apparatus includes detecting an operating state of a peripheral device to generate sensing data and transmitting the generated sensing data a display apparatus by a node terminal apparatus attached to the peripheral device, and receiving the sensing data from the node terminal apparatus, determining the operating state of the peripheral device based on the sensing data, and displaying a user interface (UI) containing the operating state of the peripheral device, by the display apparatus.

The method may further include performing pairing with the node terminal apparatus according to pairing request of the node terminal apparatus by the display apparatus, and in response to the sensing data of the peripheral device being received from the paired node terminal apparatus, transmitting the received sensing data to an external server by the display apparatus, receiving device information of the peripheral device from the external server, and registering the peripheral device.

The UI may be a peripheral device UI including a UI element corresponding to at least one peripheral device, and the displaying may include adding a UI element corresponding to a peripheral device registered in the display apparatus to the peripheral device UI and displaying the peripheral device UI.

The method may further include determining a position of the UI element corresponding to the peripheral device registered in the peripheral device UI according to a user command, and determining a relative distance of the UI element of the peripheral device registered in the peripheral device UI based on signal intensity of the node terminal apparatus attached to the registered peripheral device, wherein the displaying may include adding a UI element corresponding to the registered peripheral device to the peripheral device UI and displaying the peripheral device UI based on a position and determined distance of the UI element.

The displaying may include displaying an operating state of the peripheral device on a UI element corresponding to a peripheral device with the node terminal apparatus attached thereto.

The displaying may include displaying the operating state of the peripheral device on the UI element corresponding to the peripheral device with the node terminal apparatus attached thereto with an animation effect or displaying the operating state in the form of message popup around the UI element corresponding to the peripheral device with the node terminal apparatus attached thereto.

The UI may be a message UI for guiding an operating state of a peripheral device with the node terminal apparatus attached thereto, and the displaying may include, in response to the sensing data being received from the node terminal apparatus during display of image content, displaying the message UI for guiding the operating state determined based on the received sensing data on image content.

The message UI may be displayed in the form of popup in a region for displaying a UI element corresponding to a peripheral device with the node terminal apparatus attached thereto from regions for displaying the image content.

The method may further include determining a position of a user terminal apparatus communicable with the display apparatus, changing a peripheral device UI including a UI element corresponding to the at least one peripheral device to correspond to a screen of the user terminal apparatus based on the determined position of the user terminal apparatus and a direction in which the user terminal apparatus is directed, and transmitting the peripheral device UI to the user terminal apparatus, according to a user command, by the display apparatus.

The node terminal apparatus may be attachable and detachable to and from a surface of the peripheral device, and the generating may include sensing at least one of vibration feedback generated according to an operating state of the peripheral device and event notification feedback to generate sensing data upon being attached to the surface of the peripheral device.

The method may further include transmitting control information corresponding to the operating state of the peripheral device determined based on the sensing data to the node terminal apparatus by the display apparatus, and controlling an operation of a peripheral device with the node terminal apparatus attached thereto based on the control information received from the display apparatus by the node terminal apparatus.

According to one or more exemplary embodiments, a peripheral device management system may provide an IOT service to a peripheral device that may not be capable of supporting the IOT service and may intuitively provide an operating state of the peripheral device to a user through the IOT service.

Additional and/or other aspects will be set forth in part in the description which follows and, in part, will be obvious from the description, or may be learned by practice of exemplary embodiments.

BRIEF DESCRIPTION OF THE DRAWINGS

One or more exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions may not be described in detail if they would obscure the disclosure with unnecessary detail.

Below, exemplary embodiments will be described in more detail with reference to the accompanying drawings, in which:

FIG. 13 is a flowchart of a method for registering a node terminal apparatus by a display apparatus of a peripheral device management system, according to an exemplary embodiment;

FIG. 14 is a flowchart of a method for managing a peripheral device to which a node terminal apparatus a is attached, by a display apparatus according to an exemplary embodiment;

DETAILED DESCRIPTION OF EXEMPLARY EMBODIMENTS

Exemplary embodiments will be described below in greater detail with reference to the accompanying drawings.

The terms used in the present disclosure are used to describe the exemplary embodiments, but are not intended to limit the scope of the disclosure. The singular expression may include the plural meaning unless it is clearly stated otherwise. In the present disclosure, the terms "including" and "comprising" designate the presence of features, numbers, steps, operations, components, elements, or a combination thereof, but do not exclude the presence or possibility of addition of one or more other features, numbers, steps, operations, components, elements, or a combination thereof.

According to one or more exemplary embodiments, a "module" or a "unit" may perform at least one function or operation, and may be implemented with hardware, software, or a combination of hardware and software. In addition, a plurality of "modules" or a plurality of "units" may be integrated into at least one module and may be implemented with at least one processor.

Figure 1:
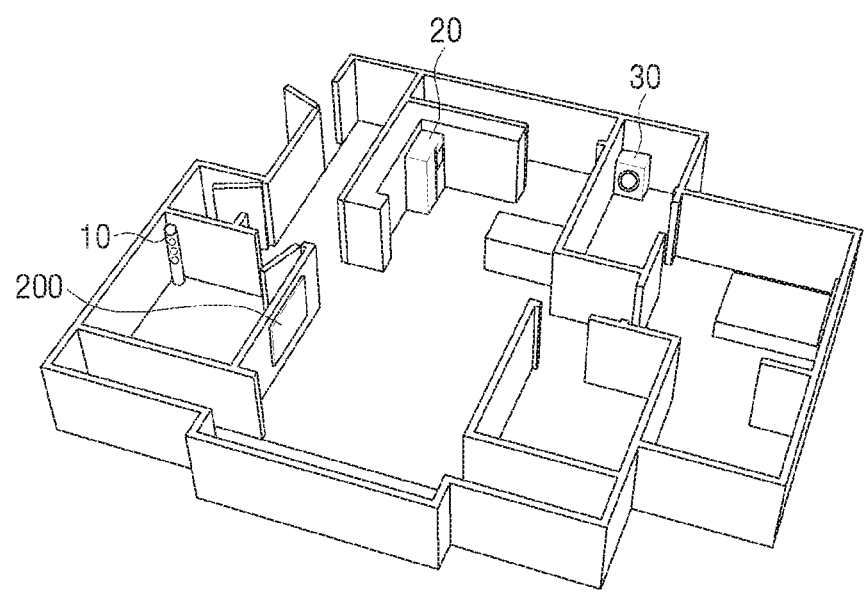
FIG. 1 is a diagram illustrating an example of a peripheral device management system, according to an exemplary embodiment.

FIG. 1 is a diagram illustrating an example of a peripheral device management system according to an exemplary embodiment.

The peripheral device management system may include a node terminal apparatus 100 and a display apparatus 200. Here, the node terminal apparatus 100 may be attached to a peripheral device, may detect an operating state of the peripheral device through a sensor, generate the detected sensing data, and transmit the generated sensing data to the display apparatus 200. The display apparatus 200 may perform data communication with the node terminal apparatus 100 paired therewith, determine an operating state of the peripheral device to which the node terminal apparatus 100 is attached based on sensing data received from the node terminal apparatus 100, and display a user interface (UI) image containing the operating state of the peripheral device based on the determined operating state or transmit a control signal for control of an operation of the peripheral device to the node terminal apparatus 100 based on the determined operating state. As illustrated in FIG. 1, a plurality of electronic devices may be positioned in a room, a kitchen, a living room, etc., in the home. In this example, an air conditioner 10, a refrigerator 20, and a washing machine 30, among the plurality of electronic devices, are peripheral devices to which the node terminal apparatus 100 is attached, and the display apparatus 200, such as a smart television (TV), may be a hub apparatus that performs data communication with the node terminal apparatus 100 attached to each peripheral device.

The node terminal apparatus 100 attached to a peripheral device such as the air conditioner 10 may detect an operating state of the air conditioner 10 through a sensor, generate the detected sensing data, and transmit the sensing data to the display apparatus 200. The display apparatus 200 may recognize the operating state the air conditioner 10 based on the sensing data received from the node terminal apparatus 100 and display a UI containing the operating state of the air conditioner 10. Accordingly, a user may check whether the air conditioner 10 is currently being operated through the UI image displayed on the display apparatus 200.

The display apparatus 200 may transmit control information for control of an operation of the air conditioner 10 to the node terminal apparatus 100 according to the recognized operating state. In response to control information being received from the display apparatus 200, the node terminal apparatus 100 may control the operation of the air conditioner 10 based on the received control information. For example, the air conditioner 10 to which the node terminal apparatus 100 is attached may be powered on or off, or a strength of the air conditioner 10 may be adjusted according to a control command of the node terminal apparatus 100.

Figure 2:
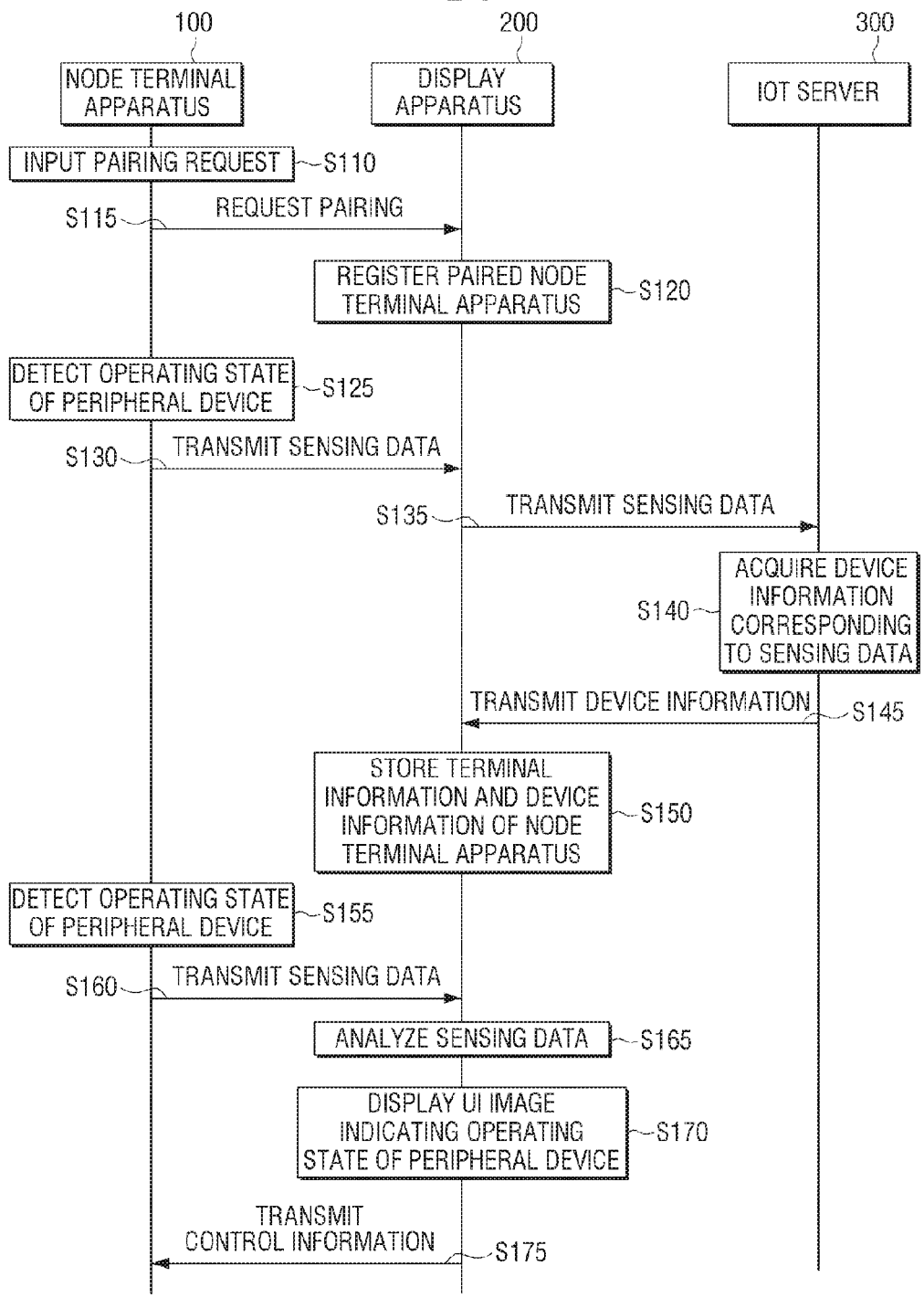
FIG. 2 is a diagram illustrating a procedure of a peripheral device management system, according to an exemplary embodiment.

FIG. 2 is a diagram illustrating a procedure of a peripheral device management system according to an exemplary embodiment.

As illustrated in FIG. 2, in response to a pairing request command being input (S110), the node terminal apparatus 100 that is not registered in the display apparatus 200 may request the display apparatus 200 for pairing (S115). According to one or more exemplary embodiments, in response to a power-on command being input from a user, the node terminal apparatus 100 may transmit an IR signal for pairing request to the display apparatus 200.

The display apparatus 200 that receives the IR signal for pairing request may determine whether the node terminal apparatus 100 that transmits the IR signal is registered in the display apparatus 200 based on terminal information contained in the received IR signal. According to the determination result, if the node terminal apparatus 100 transmitting the IR signal is registered in the display apparatus 200, the display apparatus 200 may perform pairing with the node terminal apparatus 100 based on the received IR signal. If the IR signal is not registered, the display apparatus 200 may store terminal information of the paired node terminal apparatus 100 and register the paired node terminal apparatus 100 while performing pairing with the node terminal apparatus 100 based on the received IR signal (S120).

When pairing between the node terminal apparatus 100 and the display apparatus 200 is completed, the node terminal apparatus 100 may sense the operating state of the peripheral device to which the node terminal apparatus 100 is attached (S125). The node terminal apparatus 100 may sense at least one of event notification feedback generated according to the operating state of the peripheral device to which the node terminal apparatus 100 is attached and vibration feedback such as a beep sound. In response to at least one of the vibration feedback and the event notification feedback being sensed, the node terminal apparatus 100 may generate the sensing data and transmit the sensing data to the display apparatus 200 (S130).

In response to the sensing data being received from the node terminal apparatus 100, the display apparatus 200 may determine whether device information containing control information for each operating state and identification information about the peripheral device, to which the node terminal apparatus 100 transmitting the sensing data is attached, is stored. According to the determination result, if the device information about the peripheral device, to which the node terminal apparatus 100 is attached, is not stored, the display apparatus 200 may transmit the sensing data to an Internet of things (IOT) external server 300 (S135). Here, the external server 300 may store device information containing vibration pattern information generated according to operating states for a plurality of respective peripheral devices and beep sound pattern information indicating event occurrence.

Accordingly, the external server 300 may acquire device information associated with the sensing data received from the display apparatus 200 based on pre-stored device information for each of the plurality of peripheral devices (S140). For example, the sensing data received from the display apparatus 200 may be detected information of the vibration feedback generated according to the operating state of the peripheral device to which the node terminal apparatus 100 is attached. In this case, the external server 300 may compare vibration pattern information contained in the pre-stored device information for each of the plurality of peripheral devices with sensing data of the vibration feedback and acquire device information containing vibration pattern information having a similar pattern to the sensing data.

In response to the device information being acquired, the external server 300 may transmit the acquired device information to the display apparatus 200 (S145), and the display apparatus 200 may match and store device information of the node terminal apparatus 100, which transmits operating state information, and device information received from the external server 300 (S150). However, exemplary embodiments are not limited to this.

The display apparatus 200 may periodically receive and store device information for each of the plurality of peripheral devices, which is pre-stored in the external server 300, from the external server 300, or may receive and store the device information for each of the plurality of peripheral devices whether the device information is updated to the external server 300.

In this case, in response to the sensing data being received from the node terminal apparatus 100, the display apparatus 200 may acquire device information associated with the received sensing data based on pre-stored device information for each of the plurality of peripheral devices and match and store the acquired device information and terminal information of the corresponding node terminal apparatus 100.

Figure 3:
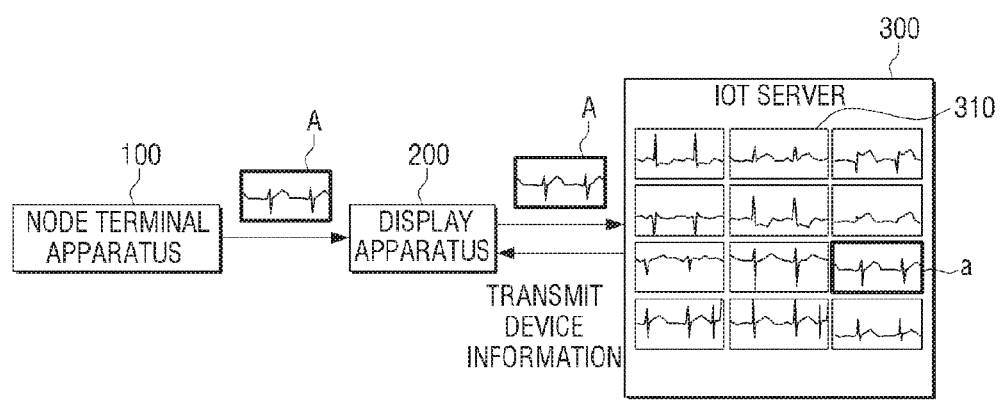
FIG. 3 is a diagram illustrating an example of an acquisition of device information of a peripheral device attached to a node terminal apparatus in a peripheral device management system, according to an exemplary embodiment.

FIG. 3 is a diagram illustrating an example of acquisition of device information of a peripheral device attached to a node terminal apparatus 100 in a peripheral device management system according to an exemplary embodiment.

As illustrated in FIG. 3, the node terminal apparatus 100 may sense an operating state of the peripheral device to which the node terminal apparatus 100 is attached and transmit the sensed sensing data to the display apparatus 200.

For example, the peripheral device to which the node terminal apparatus 100 is attached may be a model 'V3' washing machine available from a manufacturer 'S'. When the washing machine performs a washing operation, the node terminal apparatus 100 attached to the washing machine may detect vibration feedback generated for a preset time period according to the washing operation and transmit sensing data 'A' for the detected vibration feedback to the display apparatus 200.

In response to sensing data 'A' being received from the node terminal apparatus 100, a display apparatus 200 that does not store device information of the model 'V3' washing machine may transmit the received sensing data 'A' to the external server 300. Accordingly, the external server 300 may acquire device information associated with the sensing data 'A' from pre-stored device information for each of the plurality of peripheral devices.

The external server 300 may store device information containing vibration pattern information 310 generated from a peripheral device for each model available from each manufacturer and beep sound pattern information indicating event occurrences. Accordingly, the external server 300 may compare vibration pattern information contained in the device information for each of the plurality of peripheral devices with the sensing data 'A' for the vibration data of the washing machine, sensed by the node terminal apparatus 100, to acquire device information of a peripheral device having vibration pattern 'a' similar to the sensing data 'A'. Here, the device information acquired with respect to the sensing data 'A' may include at least one of manufacturer information, identification (model) information of a peripheral device, sensing pattern information generated according to each operating state of the corresponding peripheral device, operating state information corresponding to the sensing pattern information, and control information for control of a peripheral device for each operating state. Here, at least two of the sensing pattern information generated according to an operating state, the operating state information, and the control information may be matched with each other.

In response to the device information being acquired, the external server 300 may transmit the acquired device information to the display apparatus 200, and the display apparatus 200 may match and store terminal information of the node terminal apparatus 100, which transmits sensing data of the washing machine, and device information received from the external server 300.

The node terminal apparatus 100 may be a detachable terminal apparatus. In this case, the node terminal apparatus 100 may be detachably attached to a plurality of peripheral devices. For example, the node terminal apparatus 100 may be detachably attached to the air conditioner 10 and the refrigerator 20. In this case, via the aforementioned operation, the display apparatus 200 may store both device information about a peripheral device of the air conditioner 10 to which the node terminal apparatus 100 has been attached and device information about a peripheral device of the refrigerator 20 to which the node terminal apparatus 100 is currently attached. That is, the display apparatus 200 may match and store terminal information of the node terminal apparatus 100 and the device information of the peripheral device of the air conditioner 10, or match and store terminal information of the node terminal apparatus 100 and device information of the peripheral device of the refrigerator 20.

While the terminal information of the node terminal apparatus 100 and the device information of the peripheral device, to which the node terminal apparatus 100 is attached, are stored in the display apparatus 200, the node terminal apparatus 100 may sense or detect at least one of vibration feedback generated according to the operating state of the peripheral device (S155), to which the node terminal apparatus 100 is attached, and event notification feedback and transmit the sensed data to the display apparatus 200 (S160).

In response to the sensing data being received, the display apparatus 200 may identify a peripheral device, to which the node terminal apparatus 100 is attached, from the terminal information of the node terminal apparatus 100 contained in the received sensing data to acquire device information of the corresponding peripheral device. Then the display apparatus 200 may extract sensing pattern information similar to the sensing data from pre-acquired device information and acquire operating state information that is matched with the extracted sensing pattern information and stored (S160). Then the display apparatus 200 may display a UI image indicating an operating state of the peripheral device (S170), to which the node terminal apparatus 100 that transmits the sensing data is attached, based on the acquired operating state information. Accordingly, a user may check a current operating state of the peripheral device based on the UI image displayed on a screen of the display apparatus 200.

The display apparatus 200 may acquire control information for control of an operation of a peripheral device obtained by matching and storing the sensing data and the acquired operating state information. In response to the control information for control of the peripheral device being received, the display apparatus 200 may transmit the acquired control information to the node terminal apparatus 100. Accordingly, the node terminal apparatus 100 may control an operation of the peripheral device, to which the node terminal apparatus 100 is attached, based on the control information received from the display apparatus 200. The display apparatus 200 may display a UI image indicating the operating state of the corresponding peripheral device and then transmit control information corresponding to the operating state of the peripheral device to the node terminal apparatus 100 (S175).

Figure 4:
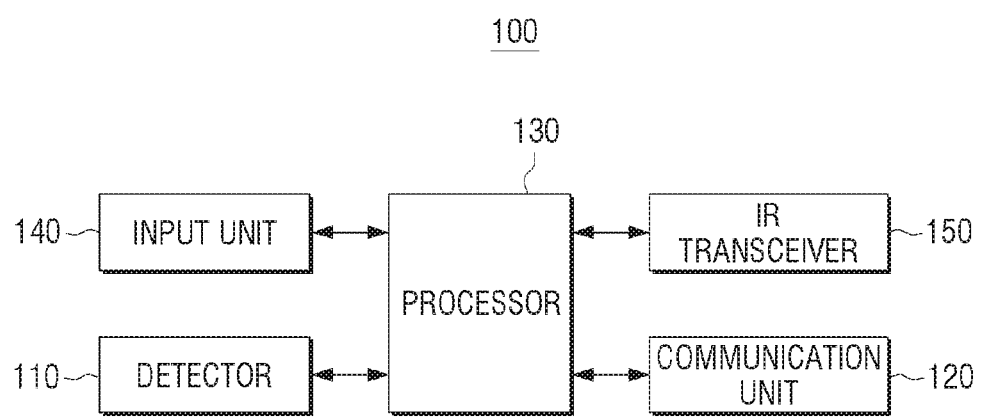
FIG. 4 is a block diagram of a node terminal apparatus according to an exemplary embodiment.

FIG. 4 is a block diagram of the node terminal apparatus 100 according to an exemplary embodiment.

As illustrated in FIG. 4, the node terminal apparatus 100 may include a detector 110, a communication unit 120 (e.g., communication interface), a processor 130, an input unit 140 (e.g., input interface), and an IR transceiver 150.

The detector 110 may periodically sense at least one of vibration feedback generated according to an operating state of a peripheral device, to which the node terminal apparatus 100 is attached, and event notification feedback. In one or more exemplary embodiments, the detector 110 may include at least one of an acceleration sensor for detection of vibration feedback generated according to an operating state of a peripheral device, to which the node terminal apparatus 100 is attached, a voice recognition sensor for detection of beep sound generated according to the operating state of the corresponding peripheral device, and a temperature sensor for detection of temperature of surrounding environment.

The communication unit 120 may wirelessly perform data communication with the display apparatus 200 paired therewith to transmit an operating state of a peripheral device to the display apparatus 200 or to receive control information corresponding to the operating state of the peripheral device from the display apparatus 200. In one or more exemplary embodiments, the communication unit 120 may be embodied as a local-area wireless communication module. Here, the local-area wireless communication module may perform wireless communication with the display apparatus 200 positioned within a local area and may include at least one of a Bluetooth module, a near field communication (NFC) module, a Wi-Fi module, and a Zigbee module.

According to an exemplary embodiment, the processor 130 may be a component for control of an operation of the node terminal apparatus 100, may be interchangeably used with a central processing apparatus, a micro processor, a controller, and the like, and may be a processing apparatus for controlling an overall operation of the node terminal apparatus 100. The processor 130 may be integrated with the input unit 140 and the IR transceiver 150, as well as the detector 110 and the communication unit 120 to be embodied as a system-on-a-chip (SOC) or a system on chip (SoC).

The processor 130 may generate sensing data sensed through the detector 110 and control the communication unit 120 to transmit the generated sensing data to the display apparatus 200. In addition, in response to control information for control of the operation of the peripheral device, to which the node terminal apparatus 100 is attached, being received through the communication unit 120, the processor 130 may control an operation of the corresponding peripheral device based on the received control information. Here, the control information may be information for control of the operation of the corresponding peripheral device with respect to the sensing data transmitted to the display apparatus 200 from control information for each operating state of the peripheral device to which the node terminal apparatus 100 is attached.

In response to the control information being received, the processor 130 may control the IR transceiver 150 to transmit a control signal for control of a peripheral device based on the received control information. Accordingly, the IR transceiver 150 may transmit the control signal corresponding to a control command of the processor 130, and a peripheral device to which the node terminal apparatus 100 is attached may perform an operation based on the control signal transmitted through the IR transceiver 150 of the node terminal apparatus 100.

As described above, the IR transceiver 150 may transmit an IR signal for pairing between the node terminal apparatus 100 and the display apparatus 200 as well as transmit an IR signal corresponding to the control command for control of the operation of the peripheral device to which the node terminal apparatus 100 is attached. In addition, the input unit 140 may receive a power on command, a pairing request command, or the like from a user.

According to an exemplary embodiment, when the node terminal apparatus 100 is not registered in the display apparatus 200, the node terminal apparatus 100 may perform pairing with the display apparatus 200. In response to an initial power on command being input through the input unit 140 to supply power to each component of the node terminal apparatus 100, the processor 130 may control the IR transceiver 150 to transmit an IR signal for pairing with the display apparatus 200. According to the control command, the IR transceiver 150 may transmit the IR signal for pairing with the display apparatus 200. Accordingly, the display apparatus 200 may perform pairing with the node terminal apparatus 100 based on the IR signal received from the node terminal apparatus 100 and register and store the paired node terminal apparatus 100 in the display apparatus 200.

According to another exemplary embodiment, in response to a pairing request command being input through the input unit 140, the processor 130 may control the IR transceiver 150 to transmit the IR signal for pairing with the display apparatus 200. According to the control command, the IR transceiver 150 may transmit the IR signal for pairing with the display apparatus 200. Accordingly, the display apparatus 200 may perform pairing with the node terminal apparatus 100 based on the IR signal received from the node terminal apparatus 100 and register and store the paired the node terminal apparatus 100 in the display apparatus 200.

When pairing between the node terminal apparatus 100 and the display apparatus 200 is completed via the above series of operations, the node terminal apparatus 100 attached to one surface of the peripheral device may sense at least one of vibration feedback generated according to the operating state of the peripheral device and event notification feedback through the detector 110. In response to at least one of the vibration feedback generated according to the operating state of the peripheral device and the event notification feedback being sensed through the detector 110, the processor 130 may control the communication unit 120 to transmit sensing data sensed through the detector 110 to the display apparatus 200.

In response to control information for control of an operation of a peripheral device to which the node terminal apparatus 100 is attached being received from the display apparatus 200 that transmits sensing data, the processor 130 may control the IR transceiver 150 to transmit a control signal for control of an operation of the corresponding peripheral device based on the received control information. Accordingly, the IR transceiver 150 my transmit the control signal for control of the operation of the peripheral device to which the node terminal apparatus 100 is attached, and the peripheral device may perform an operation corresponding to the transmitted control signal.

Figure 5:
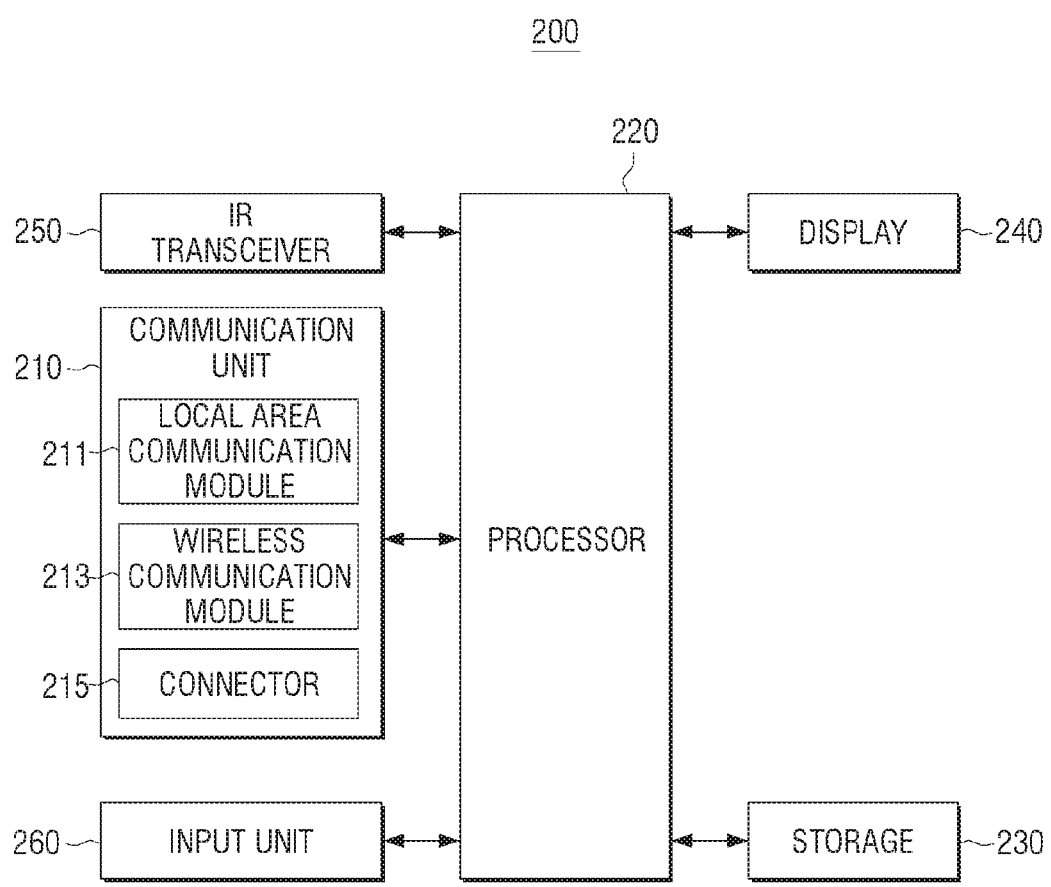
FIG. 5 is a block diagram of a display apparatus, according to an exemplary embodiment.

FIG. 5 is a block diagram of the display apparatus 200 according to an exemplary embodiment.

As illustrated in FIG. 5, the display apparatus 200 may include a communication unit 210 (e.g., communication interface), a processor 220, and a storage 230 (e.g., memory).

The communication unit 210 may perform data communication with at least one user terminal apparatus 400 or a content server for providing image content as well as perform data communication with the paired node terminal apparatus 100. In this case, the communication unit 210 may include a local area communication module 211 (e.g., local area communication interface), a wireless communication module 213 (e.g., wireless interface) such as a wireless LAN module, and a connector 215, including at least one of wired communication modules such as a high-definition multimedia interface (HDMI), a universal serial bus (USB), and Institute of Electrical and Electronics Engineers (IEEE) 1394.

The local area communication module 211 may be a component for wireless local area communication between the display apparatus 200 and the node terminal apparatus 100. The local area communication module 211 may include at least one of a Bluetooth module, a near field communication (NFC) module, a Wi-Fi module, and a Zigbee module.

The wireless communication module 213 may be a module that is connected to an external network according to a wireless communication protocol such as IEEE to perform communication. In addition, the wireless communication module 213 may further include a mobile communication module that accesses a mobile communication network to perform communication according to various mobile communication standards such as $3^{rd}$ generation (3G), $3^{rd}$ generation partnership project (3GPP), and long term evolution (LTE).

The communication unit 210 may be embodied using the aforementioned various local area communication methods or may employ other communication technologies.

The connector 215 may be a component for providing an interface with various apparatuses such as USB 2.0, USB 3.0, HDMI, and IEEE 1394. The connector 215 may receive image content data from a content server through a wired cable connected to the connector 215 according to a control command of the processor 220. In addition, the connector 215 may receive power from a power source through a wired cable that is physically connected to the connector 215.

The processor 220 may control an overall operation of each component of the display apparatus 200. In response to sensing data sensed from the paired node terminal apparatus 100 being received through the communication unit 210, the processor 220 may acquire device information of the peripheral device to which the corresponding node terminal apparatus 100 is attached from information of a plurality of devices, which is pre-stored in the storage 230, based on the terminal information of the node terminal apparatus 100 contained in the received sensing data. Then the processor 220 may extract sensing pattern information similar to the sensing data from pre-acquired device information and display a UI image indicating an operating state of the peripheral device based on the operating state information, which is matched with the extracted sensing pattern information and stored, and the control information or transmit control information for control of the corresponding peripheral device to the node terminal apparatus 100 through the communication unit 210.

The storage 230 that stores device information of a plurality of peripheral devices may match and store terminal information of the pre-registered node terminal apparatus 100 and device information of the peripheral device to which the corresponding node terminal apparatus 100 is attached. The device information of the peripheral device may include at least one of manufacturer information, identification (model) information of a peripheral device, sensing pattern information generated according to each operating state of the corresponding peripheral device, operating state information corresponding to the sensing pattern information, and control information for control of a peripheral device for each operating state. At least two of the sensing pattern information generated according to an operating state, the operating state information, and the control information may be matched with each other.

In addition, the storage 230 may be managed by an operating system (OS) program and an OS for control of an operation of the display apparatus 200, may perform an operation of the display apparatus 200 using resources of the OS, and store an application program that provides a user interface. The OS may be an execution program that is read and compiled by the storage 230 and operates each component of the display apparatus 200 when the display apparatus 200 is turned on.

In addition, the storage 230 may store various multimedia data items processed by the processor 220, image content, and various data items received from an external source such as a content server. The storage 230 may be embodied as at least one of a read only memory (ROM), a random access memory (RAM), a memory card (e.g., a SD card and a memory stick) to be attached/detached to and from the display apparatus 200, a non-volatile memory, a volatile memory, a hard disc drive (HDD), and a solid state drive (SSD).

Below, the aforementioned processor 220 will be described in more detail. As described above, in response to sensing data being received from the paired node terminal apparatus 100, the processor 220 may identify a peripheral device, to which the node terminal apparatus 100 is attached, based on terminal device contained in the received sensing data. That is, the processor 220 may acquire the device information that is matched with the terminal information contained in the sensing data and stored from information of a plurality of devices, which is pre-stored in the storage 230, and may identify a peripheral device to which the node terminal apparatus 100 is attached.

As described above, the device information of the peripheral device may include at least one of manufacturer information, identification (model) information of a peripheral device, sensing pattern information generated according to each operating state of the corresponding peripheral device, operating state information corresponding to the sensing pattern information, and control information for control of a peripheral device for each operating state. In addition, at least two of the sensing pattern information generated according to an operating state, the operating state information, and the control information may be matched with each other and stored.

In response to the device information of the identified peripheral device being acquired, the processor 220 may compare the received sensing data and the sensing pattern information contained in the device information to acquire sensing pattern information similar to the sensing data and acquire at least one of operating state information matched with the sensing pattern information and control information from the acquired sensing pattern information.

In response to the operating state information being acquired from the acquired sensing pattern information, the processor 220 may control a display 240 to display a UI image indicating an operating state of a peripheral device, to which the node terminal apparatus 100 that transmits the sensing data is attached, based on the acquired operating state information. According to such a control command, the display 240 may display the UI image indicating the operating state of the peripheral device. Accordingly, a user may check a current operating state of the peripheral device based on the UI image displayed on a screen of the display apparatus 200.

In response to control information being acquired from the sensing pattern information, the processor 220 may transmit control information that is pre-acquired through the communication unit 210 to the node terminal apparatus 100 that transmits sensing data. Accordingly, the node terminal apparatus 100 may control an operation of the peripheral device, to which the node terminal apparatus 100 is attached, based on the control information received from the display apparatus 200.

According to an exemplary embodiment, the node terminal apparatus 100 may be attached to the air conditioner 10 and may detect an operating state of the air conditioner 10. When the air conditioner 10 performs a cooling operation according to a user command, the node terminal apparatus 100 attached to the air conditioner 10 may sense vibration feedback generated according to the cooling operation of the air conditioner 10 for a preset time period. In this case, the node terminal apparatus 100 may further sense surrounding temperature. The node terminal apparatus 100 may transmit sensing data about the sensed vibration feedback and sensed surrounding temperature value to the display apparatus 200. Accordingly, the processor 220 may acquire device information that is matched with terminal information contained in the received sensing data and stored from information of a plurality of devices, which is pre-stored in the storage 230.

In response to device information of the air conditioner 10 being acquired, the processor 220 may compare vibration feedback contained in the received sensing data and sensing pattern information contained in the pre-acquired device information to acquire sensing pattern information similar to the vibration feedback and determine that the air conditioner 10 performs the cooling operation based on the operating state information matched with the acquired sensing pattern information. Accordingly, the processor 220 may display a UI image indicating that the air conditioner 10 performs the cooling operation through the display 240 based on the operating state information matched with the pre-acquired sensing pattern information.

The device information of the air conditioner 10 may include a default temperature value or a temperature value set by a user. Accordingly, the processor 220 may compare a surrounding temperature value contained in the received sensing data and a preset temperature value to determine whether the surrounding temperature value is equal to or less than a preset temperature value. According to the determination result, if the surrounding temperature value is equal to or less than a preset temperature value, the processor 220 may transmit, to the node terminal apparatus 100, control information for an operation for powering off the air conditioner 10 or control information of an operation for enhancing a temperature value set for the air conditioner 10 from control information for each operating state of the air conditioner 10 contained in the device information. In this case, the processor 220 may display a UE image indicating that temperature setting of the air conditioner 10 is adjusted on the display 240 based on the operating state information matched with the control information for enhancing a temperature value of the air conditioner 10.

In response to control information being received from the display apparatus 200, the node terminal apparatus 100 may transmit a control signal for power off to the air conditioner 10 to which the node terminal apparatus 100 is attached or transmit a control signal for setting a temperature value set in the air conditioner 10 to a value that is equal to or more than surrounding value to the air conditioner 10, according to the control information received from the display apparatus 200.

As illustrated in FIG. 5, the display apparatus 200 may further include the display 240, an IR transceiver 250, and an input unit 260.

The display 240 may display image content that is received from an external source such as a content server and signal-processed by the processor 220. As described above, the display 240 may display a UI image indicating an operating state of a peripheral device. Here, the UI may be a peripheral device UI including UI elements that respectively correspond to a plurality of peripheral devices to which the pre-registered node terminal apparatus 100 is attached. Accordingly, the display 240 may display a UI image of a peripheral device, containing UI elements that respectively correspond to the plurality of peripheral devices. The display 240 may be embodied as a liquid crystal display (LCD), an organic light emitting display (OLED), a plasma display panel (PDP), and the like. If the input unit 260 is embodied as a touchpad, the display 240 may be embodied in the form of a touchscreen constituting an interlayer structure together with the input unit 260 as a touchpad.

The IR transceiver 250 may receive a control signal for control of an operation of the display apparatus 200 from a remote control apparatus, and the processor 220 may control the operation of the display apparatus 200 based on the control signal that is received from the remote control apparatus through the IR transceiver 250. In addition, the IR transceiver 250 may receive an IR signal for pairing request from the non-registered node terminal apparatus 100. In response to the IR signal being received, the processor 220 may store terminal information of the paired node terminal apparatus 100 while performing pairing with the node terminal apparatus 100 based on the received IR signal to register the paired node terminal apparatus 100.

When pairing with the corresponding node terminal apparatus 100 is completed according to the pairing request of the node terminal apparatus 100, the processor 220 may control the display 240 to display an operation guide message of the corresponding node terminal apparatus 100. Here, the operation guide message may be guide information for attaching the paired node terminal apparatus 100 to a peripheral device. Accordingly, the display 240 may display the operation guide message for attaching the paired node terminal apparatus 100 to the peripheral device such that the user attaches the node terminal apparatus 100 to the peripheral device according to the displayed operation guide message.

According to an exemplary embodiment, the node terminal apparatus 100 attached to the peripheral device may sense at least one of vibration feedback generated according to an operating state of the corresponding peripheral device and event notification feedback and transmit generated sensing data to the display apparatus 200. In response to the sensing data being received from the paired node terminal apparatus 100, the processor 220 may determine whether device information related to terminal information contained in the received sensing data is stored from device information of a plurality of peripheral devices, which is pre-stored in the storage 230. According to the determination result, if the device information is not stored, the processor 220 may transmit the received sensing data to the external server 300.

Then in response to identification information and device information of the peripheral device, to which the node terminal apparatus 100 that transmits the sensing data is attached, being received from the external server 300, the storage 230 may match and store terminal information of the node terminal apparatus 100 that transmits the sensing data and the device information received from the external server 300 according to a control command of the processor 220. The input unit 260 may be an input element for receiving various user manipulations and forwarding the user manipulations to the processor 220 and may be embodied as an input panel. The input panel may be configured in the form of at least one of a touchpad, a keypad including various functions keys, number keys, character keys, etc., and a touchscreen.

According to an exemplary embodiment, the UI indicating an operating state of a peripheral device may be a peripheral device UI containing a UI element corresponding to at least one peripheral device. The processor 220 that controls the display 240 to display the peripheral device UI may determine a position of a UI element corresponding to each peripheral device pre-registered in the peripheral device UI according to a user command input through the input unit 260. Then the processor 220 may determine a relative distance between the display apparatus 200 and each node terminal apparatus 100 based on intensity of a signal received from each node terminal apparatus 100 attached to a peripheral device.

The processor 220 may control the display 240 to rearrange positions of a plurality of UI elements corresponding to respective peripheral devices to which the node terminal apparatus 100 is attached, according to the determined relative distance between the display apparatus 200 and each node terminal apparatus 100 and to display the peripheral device UI image containing the plurality of rearranged UI elements. Accordingly, the display 240 may display the peripheral device UI image containing the plurality of rearranged UI elements according to the determined distance between the display apparatus 200 and each node terminal apparatus 100.

When a new node terminal apparatus 100 and a peripheral device to which the new node terminal apparatus 100 is attached are registered via such series of operations, the processor 220 may control the display 240 to add a UI element corresponding to the registered peripheral device to the peripheral device UI and to display the peripheral device UI.

In one or more exemplary embodiments, the processor 220 may determine a position of a UI element corresponding to a peripheral device registered in the peripheral device UI according to a user command input through the input unit 260. The processor 220 may determine a relative distance of a UI element corresponding to a peripheral device registered in the peripheral device UI based on signal intensity of the node terminal apparatus 100 attached to the registered peripheral device. According to an exemplary embodiment, the display 240 may add and display the UI element corresponding to the registered peripheral device based on the position and distance determined by the processor 220 on the peripheral device UI image.

Likewise, in response to sensing data being received from the node terminal apparatus 100 while the peripheral device UI image containing UI elements corresponding to the respective pre-registered peripheral devices is displayed, the processor 220 may control the display 240 to display an operating state of the peripheral device to a UI element corresponding to a peripheral device to which the node terminal apparatus 100 is attached, based on the received sensing data.

In response to sensing data of the corresponding peripheral device being received from the node terminal apparatus 100 attached to the pre-registered peripheral device, the processor 220 may control the display 240 to visually display an event occurrence situation associated with the sensing data in a region for displaying the UI element corresponding to the peripheral device, to which the node terminal apparatus 100 that transmits the sensing data is attached, among a plurality of UI elements.

According to an exemplary embodiment, in response to sensing data of a corresponding peripheral device being received from the node terminal apparatus 100 attached to a pre-registered peripheral device, the processor 220 may control the display 240 to display an operating state of a peripheral device associated with the received sensing data on a UI element corresponding to a peripheral device, to which the node terminal apparatus 100 that transmits the sensing data, is attached according to an animation effect.

According to the control command, the display 240 may display the peripheral device UI image to which an animation effect is applied, corresponding to the operating state of the peripheral device associated with the sensing data on the UI element corresponding to the peripheral device to which the node terminal apparatus 100 that transmits the sensing data is attached.

According to an exemplary embodiment, in response to device information of a peripheral device to which the corresponding node terminal apparatus 100 is attached being acquired based on the sensing data received from the node terminal apparatus 100, the processor 220 may compare sensing pattern information for each operating state contained in the acquired device information and the sensing data to acquire sensing pattern information associated with the sensing data. The processor 220 may acquire operating state information of a peripheral device, which is matched with the acquired sensing pattern information and stored. The processor 220 may control the display 240 to apply an animation effect indicating the operating state of the peripheral device to a UI element corresponding to the corresponding peripheral device based on the acquired operating state information.

Accordingly, the display 240 may display the peripheral device UI image to which the animation effect is applied on the UI element indicating the peripheral device to which the node terminal apparatus 100 that transmits the sensing data is attached.

Accordingly, a user may check a current operating state of each peripheral device from the animation effect applied to the UI element contained in the peripheral device UI image displayed on a screen of the display apparatus 200.

According to another exemplary embodiment, in response to sensing data of a corresponding peripheral device being received from the node terminal apparatus 100 to which a pre-registered peripheral device is attached, the processor 220 may display the display 240 to display an operating state of a peripheral device associated with the received sensing data via message popup around a UI element corresponding to a peripheral device to which the node terminal apparatus 100 that transmits the sensing data is attached.

According to the control command, the display 240 may display a message corresponding to the operating state of the peripheral device associated with the sensing data around a region for displaying a UI element corresponding to the peripheral device, to which the node terminal apparatus 100 that transmits the sensing data is attached, on the peripheral device UI image in the form of popup message. In response to sensing data of the corresponding peripheral device being received from the node terminal apparatus 100 attached to a pre-registered peripheral device, the processor 220 may acquire device information of the peripheral device to which the node terminal apparatus 100 is attached, based on terminal information contained in the received sensing data.

The processor 220 may compare the received sensing data with sensing pattern information for each operating state contained in the pre-acquired device information to acquire sensing pattern information associated with the sensing data. The processor 220 may acquire operating state information of a peripheral device, which is matched with the acquired sensing pattern information and stored. The processor 220 may control the display 240 to display a message indicating the operating state of the peripheral device in the form of popup around a UI element corresponding to the corresponding peripheral device based on the acquired operating state information.

Accordingly, the display 240 may display the peripheral device UI image containing the message indicating the operating state of the corresponding peripheral device in a region for displaying the UI element indicating the peripheral device to which the node terminal apparatus 100 that transmits the sensing data is attached. Accordingly, a user may check a current operating state of each peripheral device through the message that is displayed in the form of a popup message on the peripheral device UI image displayed on a screen of the display apparatus 200.

According to an exemplary embodiment, a UI containing an operating state of a peripheral device may be a message for guiding the operating state of the peripheral device to which the node terminal apparatus 100 is attached. In this case, in response to sensing data being received from the node terminal apparatus 100 during display of image content through the display 240, the processor 220 may display a message UI of the operating state of the peripheral device associated with the received sensing data on an image for displaying image content.

According to an exemplary embodiment, in response to sensing data being received from the node terminal apparatus 100 during display of image content, the processor 220 may acquire device information of a peripheral device to which the node terminal apparatus 100 is attached, based on terminal information contained in the received sensing data. Then the processor 220 may compare the received sensing data and sensing pattern information for each operating state contained in pre-acquired device information to acquire sensing pattern information associated with the sensing data. Then the processor 220 may acquire operating state information of the peripheral device, which is matched with the acquired sensing pattern information and stored. Then the processor 220 may control the display 240 to display a message UI indicating the operating state of the peripheral device on an image for displaying image content based on the acquired operating state information.

Accordingly, the display 240 may display the message UI indicating the operating state of the peripheral device to overlap on an image for displaying image content.

According to another exemplary embodiment, in response to sensing data being received from node terminal apparatus 100 during display of image content, the processor 220 may perform the aforementioned series of operations to acquire operating state information of the peripheral device associated with the received sensing data. The processor 220 may control the display 240 to display a message UI associated with pre-acquired operating state information on a region for displaying a UI element corresponding to the peripheral device, to which the node terminal apparatus 100 that transmits the sensing data is attached, in the form of popup among regions for displaying the image content.

According to the control command, the display 240 may display the message UI in the form of popup on a region for displaying a UI element corresponding to the peripheral device, to which the node terminal apparatus 100 that transmits the sensing data, among regions for displaying image content.

According to an exemplary embodiment, the processor 220 may change the peripheral device UI image containing a UI element corresponding to at least one peripheral device to correspond to a screen of the user terminal apparatus 400 based on a position of the user terminal apparatus 400 communicable with the display apparatus 200 and a direction in which the user terminal apparatus 400 is directed, on the peripheral device UI image, and transmit the changed UI image to the user terminal apparatus 400. Accordingly, the user terminal apparatus 400 may display the peripheral device UI image received from the display apparatus 200 such that the user checks a current operating state of each peripheral device through the user terminal apparatus 400 that is mobile even if the user is positioned in a place without the display apparatus 200 for providing the peripheral device UI image.

Below, an operation for displaying a peripheral device UI image containing a UI element indicating each peripheral device to which the node terminal apparatus 100 is attached, by the display apparatus 200 according to one or more exemplary embodiments will be described in detail.

Figure 6A:
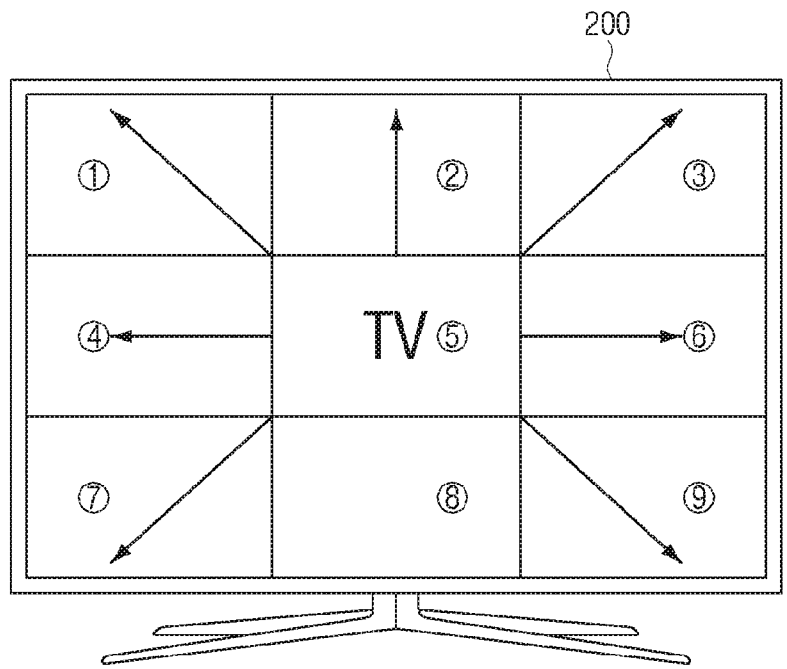
FIGS. 6A and 6B are diagrams illustrating an example in which a display apparatus displays a peripheral device UI image containing a UI element corresponding to each peripheral device, according to an exemplary embodiment.
Figure 6B:
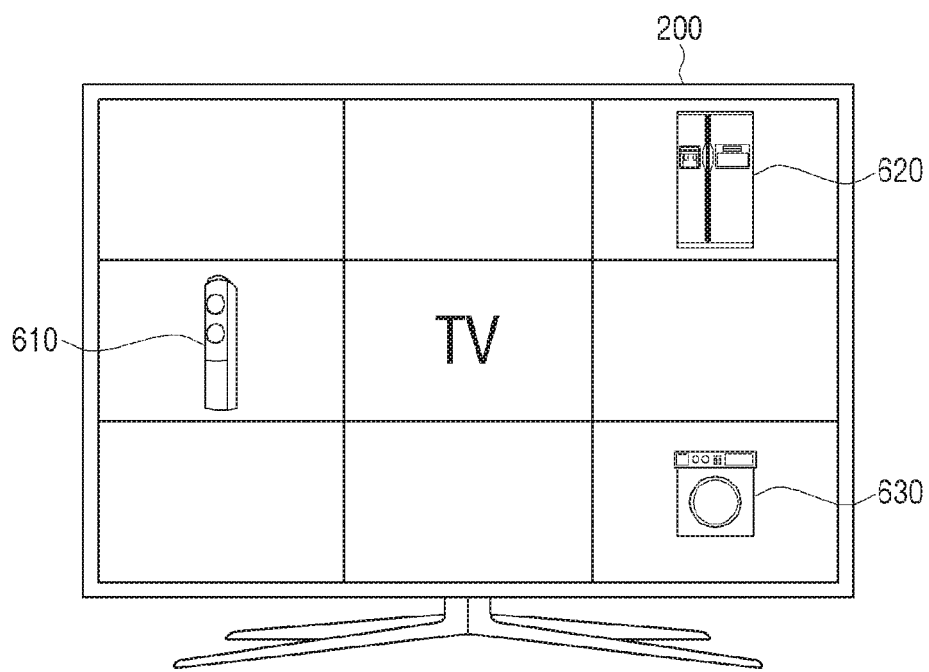

FIGS. 6A and 6B are diagrams illustrating an example in which the display apparatus 200 displays a peripheral device UI image containing a UI element corresponding to each peripheral device according to an exemplary embodiment.

The display apparatus 200 may generate a peripheral device UI image containing a UI element corresponding to each of a plurality of peripheral devices to which the node terminal apparatus 100 is attached and display the peripheral device UI image on a screen.

As illustrated in FIG. 6A, in response to a generation command of a peripheral device UI image being input, the display apparatus 200 may display a split image for selection of a region for positioning each peripheral device to which the node terminal apparatus 100 is attached. The display apparatus 200 may display a split image divided into nine regions with respect to the display apparatus 200. In response to a selection command of a peripheral device, to which the node terminal apparatus 100 is attached, being input during display of the split image divided into nine regions, the display apparatus 200 may display a UI element indicating each peripheral device, to which the node terminal apparatus 100 is attached, in a region corresponding to the input selection command.

As illustrated in FIG. 6B, according to the selection command of the user, the display apparatus 200 may generate a peripheral device UI image containing a UI element 610 indicating a peripheral device of the air conditioner 10 in a region ④, a UI element 620 indicating a peripheral device of the refrigerator 20 in a region ③, and a UI element 630 indicating a peripheral device of the washing machine 30 in a region ⑨ with respect to the display apparatus 200 and may display the peripheral device UI image.

When a position for displaying a UI element corresponding to each peripheral device, to which the node terminal apparatus 100 is attached, is determined, the display apparatus 200 may rearrange a UI element corresponding to each peripheral device according to a relative distance between the display apparatus 200 and a peripheral device to which the node terminal apparatus 100 is attached.

Figure 7:
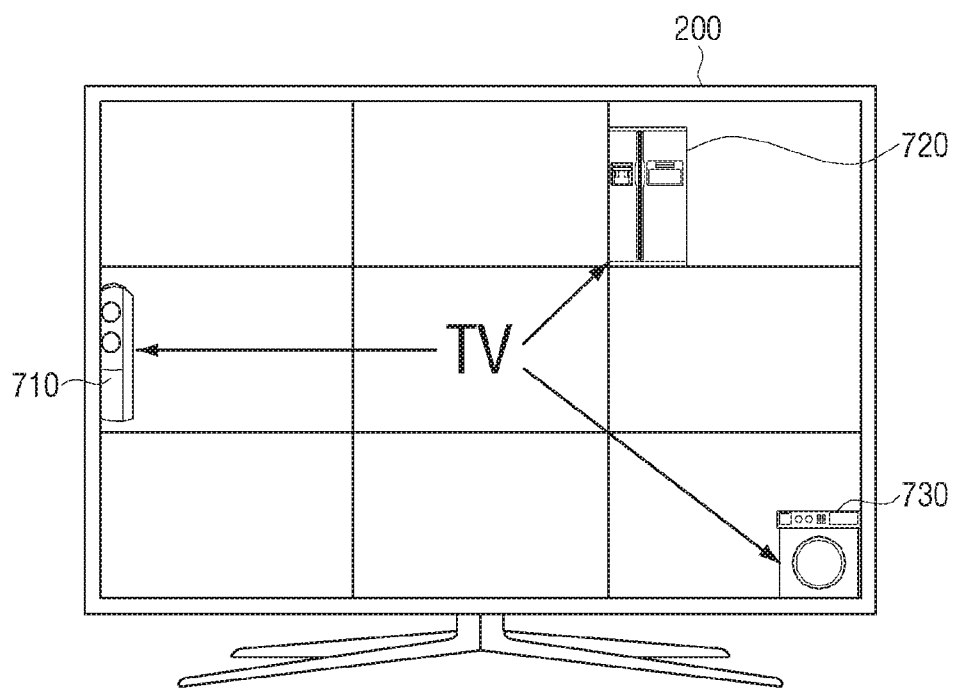
FIG. 7 is a diagram illustrating an example in which a display apparatus displays a peripheral device UI image in which UI elements corresponding to peripheral devices are rearranged according to a relative distance between the display apparatus and a peripheral device, according to an exemplary embodiment.

FIG. 7 is a diagram illustrating an example in which the display apparatus 200 displays a peripheral device UI image in which UI elements corresponding to peripheral devices are rearranged according to a relative distance between the display apparatus 200 and a peripheral device, according to an exemplary embodiment.

As described above, in the display apparatus 200, regions for displaying UI elements corresponding to respective peripheral devices to which the node terminal apparatus 100 is attached may be determined.

As illustrated in FIG. 7, with respect to the display apparatus 200, a UI element 710 corresponding to a peripheral device of the air conditioner 10 may be determined to be displayed in a region ④, a UI element 720 corresponding to a peripheral device of the refrigerator 20 may be determined to be displayed in a region ③, and a UI element 730 corresponding to a peripheral device of the washing machine 30 may be determined to be displayed in a region ⑨. Likewise, when positions for displaying the UI elements 710 to 730 corresponding to respective peripheral devices, to which the node terminal apparatus 100 is attached, are determined, the display apparatus 200 may measure intensity of a signal received from the node terminal apparatus 100 attached to each peripheral device using a receive signal strength indicator (RSSI).

The signal received from the node terminal apparatus 100 may be a BT signal (e.g., Bluetooth signal), and the BT signal may include sensing data. That is, the node terminal apparatus 100 may detect an operating state of a peripheral device attached to the node terminal apparatus 100 and transmit generated sensing data to the display apparatus 200 through the BT signal. However, exemplary embodiments are not limited thereto, and each node terminal apparatus 100 may collectively transmit BT signals according to request of the display apparatus 200.

According to an exemplary embodiment, the display apparatus 200 may measure intensity of the BT signal received from the node terminal apparatus 100 attached to each peripheral device through the RSSI and rearrange a UI element indicating each peripheral device based on the measured intensity. For example, among the air conditioner 10, the refrigerator 20, and the washing machine 30, the refrigerator 20 may be positioned closest to the display apparatus 200 and the washing machine 30 may be positioned farthest from the display apparatus 200, with respect to the display apparatus 200. In this case, the signal intensity of the node terminal apparatus 100 attached to the peripheral device of the refrigerator 20 may be measured to be highest, and the signal intensity of the node terminal apparatus 100 attached to the peripheral device of the washing machine 30 may be measured to be lowest. Accordingly, as illustrated in FIG. 7, the display apparatus 200 may display a peripheral device UI image containing a plurality of rearranged UI elements by rearranging the UI element 720 indicating the peripheral device of the refrigerator 20 positioned in a region ③ to be closest to the display apparatus 200 and rearranging the UI element 730 indicating the peripheral device of the washing machine 30 positioned in a region ⑨ to be farthest from the display apparatus 200.

Therefore, the user may more intuitively recognize a position of each peripheral device and a distance from the display apparatus 200 through the UI elements contained in the peripheral device UI image displayed through the display apparatus 200.

Figure 8A:
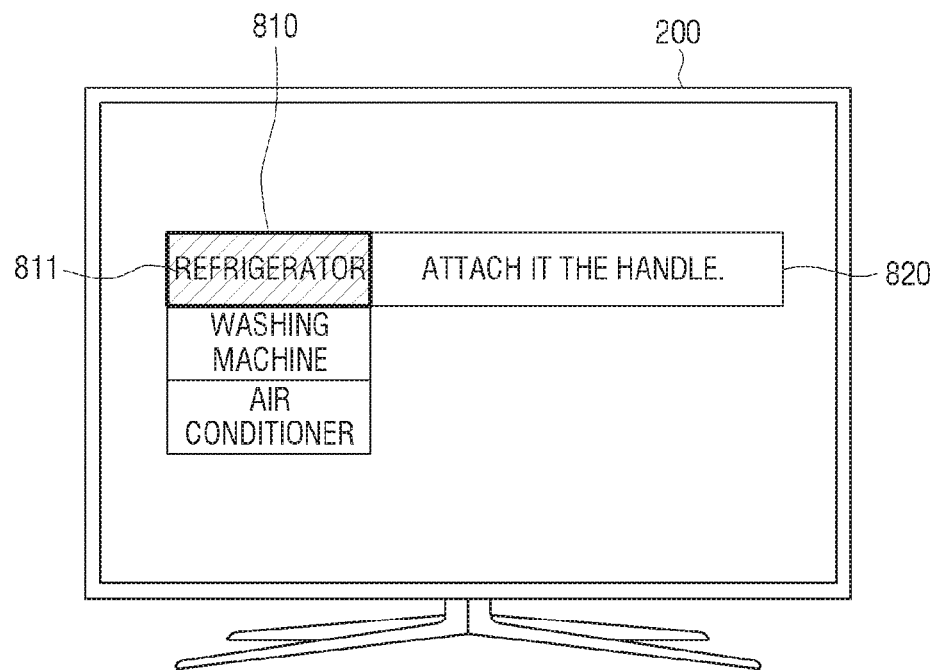
FIGS. 8A and 8B are diagrams illustrating an example in which a display apparatus registers a node terminal apparatus, according to an exemplary embodiment.
Figure 8B:
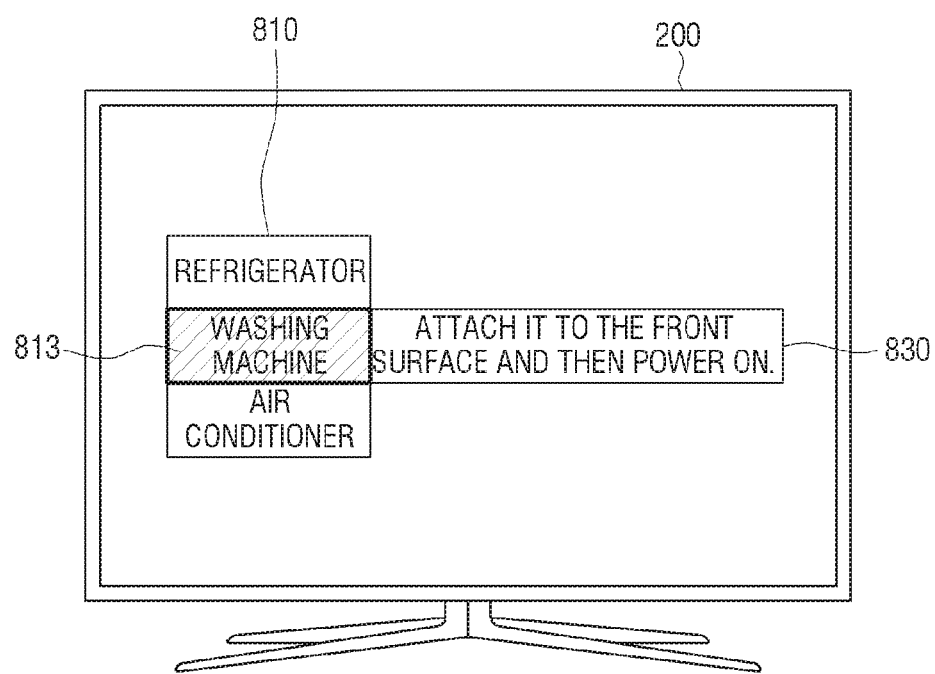

FIGS. 8A and 8B are diagrams illustrating an example in which the display apparatus 200 registers a node terminal apparatus according to an exemplary embodiment.

As described above, in response to a pairing with a corresponding node terminal apparatus 100 being completed according to a pairing request of the non-registered node terminal apparatus 100, the display apparatus 200 may display an operation guide message on a screen to appropriately attach the paired node terminal apparatus 100 to the peripheral device.

As illustrated in FIG. 8A, in response to pairing with the node terminal apparatus 100 being completed, the display apparatus 200 may display a list UI image 810 of peripheral devices. In response to a peripheral device 811 of a refrigerator being selected during display of the list UI image 810, the display apparatus 200 may display a guide message 820 of 'Attach it the handle.' based on the device characteristic information of the peripheral device 811 of the selected refrigerator.

According to an exemplary embodiment, in the case of a refrigerator, a cooling operation may be performed in real time. Accordingly, the display apparatus 200 may display the guide message 820 of 'Attach it the handle.' according to the device characteristic information of the refrigerator, and a user may attach the node terminal apparatus 100 to the handle of the refrigerator according to the displayed guide message 820. Accordingly, the node terminal apparatus 100 attached to the handle of the refrigerator may sense vibration feedback of the refrigerator to generate sensed sensing data and transmit the sensing data to the display apparatus 200.

According to an exemplary embodiment, in response to received sensing data being transmitted to the external server 300 and device information of the refrigerator, to which the node terminal apparatus 100 is attached, being received from the external server 300, the display apparatus 200 may match and store terminal information of the node terminal apparatus 100 attached to the refrigerator and the device information received from the external server 300.

As illustrated in FIG. 8B, in response to a peripheral device 813 of a washing machine being selected during display of the list UI image 810, the display apparatus 200 may display a guide message 830 of 'Attach it to the front surface and then power on,' based on device characteristic information of the peripheral device 813 of the selected washing machine.

According to an exemplary embodiment, in the case of a washing machine, the washing machine performs an operation only for a washing operation. Accordingly, the display apparatus 200 may display the guide message 830 of 'Attach it to the front surface and then power on,' according to the device characteristic of the washing machine, and a user may attach the node terminal apparatus 100 to the front surface of the washing machine according to the displayed guide message 830 and power on the washing machine. When the washing machine is powered on and a beep sound indicating that the washing machine is powered on is output, the node terminal apparatus 100 attached to the front surface of the washing machine may sense event notification feedback related to the beep sound output from the washing machine and transmit the sensed sensing data to the display apparatus 200.

Accordingly, in response to the received sensing data being transmitted to the external server 300 and the device information about the washing machine to which the node terminal apparatus 100 being received from the external server 300, the display apparatus 200 may match and store terminal information of the node terminal apparatus 100 attached to the washing machine and the device information received from the external server 300.

Figure 9A:
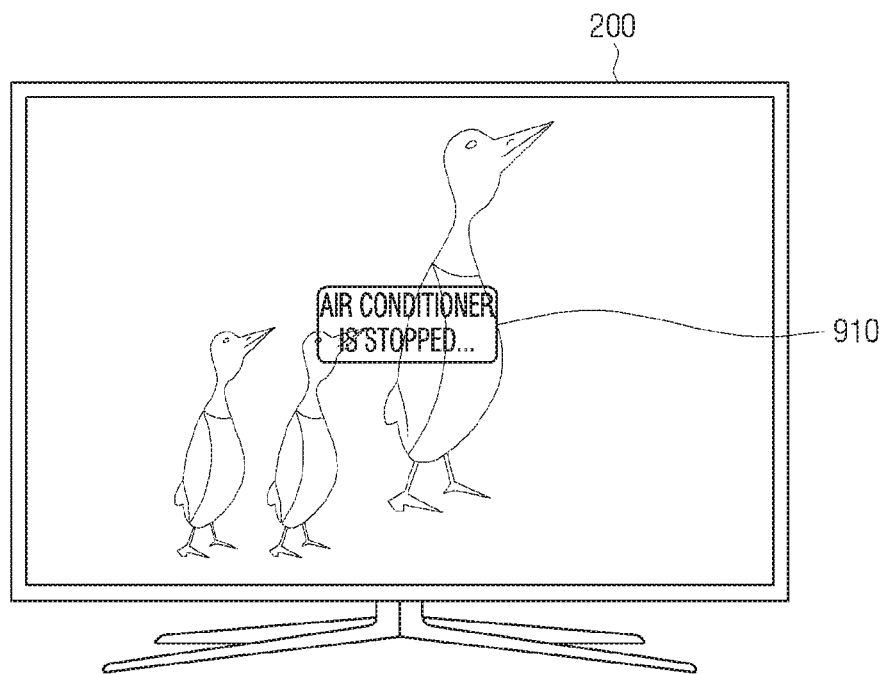
FIGS. 9A and 9B are diagrams illustrating an example in which a display apparatus visually provides an operating state of a peripheral device to which a node terminal apparatus is attached while providing image content according to an exemplary embodiment.
Figure 9B:
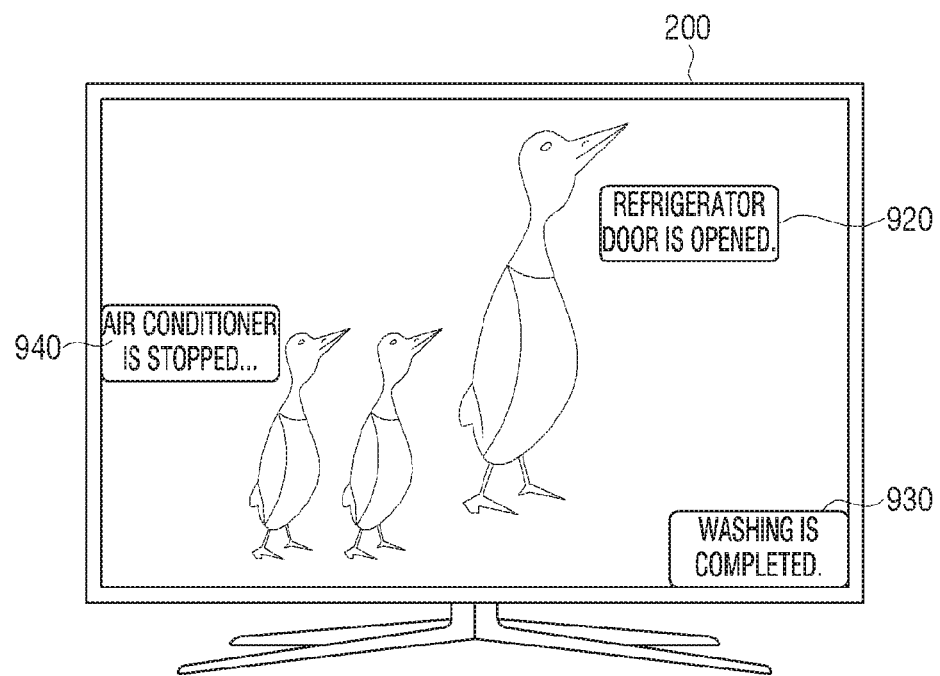

FIGS. 9A and 9B are diagrams illustrating an example in which the display apparatus 200 visually provides an operating state of a peripheral device to which the node terminal apparatus 100 is attached while providing image content according to an exemplary embodiment.

According to an exemplary embodiment, the display apparatus 200 may receive sensing data of a corresponding peripheral device from the node terminal apparatus 100 attached to a pre-registered peripheral device during image of image content. Likewise, in response to sensing data being received during display of the image content, the display apparatus 200 may display a message UI 910 indicating an operating state of a peripheral device associated with the received sensing data in the form of popup on a screen for currently displaying image content, as illustrated in FIG. 9A.

According to another exemplary embodiment, in response to sensing data being received during display of image content, the display apparatus 200 may display a message UI indicating an operating state of a peripheral device associated with the sensing data in the form of popup in a region of a screen for displaying the image content, for displaying a UI element corresponding to a peripheral device, to which the node terminal apparatus 100 that transmits the sensing data is attached.

For example, sensing data may be received from the node terminal apparatus 100 attached to each peripheral device of the refrigerator 20, the washing machine 30, and the air conditioner 10. In this case, as illustrated in FIG. 9B, the display apparatus 200 may display a message UI 920 of 'Refrigerator door is opened.', a message UI 930 of 'Washing is completed.', and a message UI 940 of 'Air conditioner is stopped.' in a region of a screen for displaying image content, for displaying a UI element corresponding to each peripheral device of the refrigerator 20, the washing machine 30, and the air conditioner 10.

Figure 10:
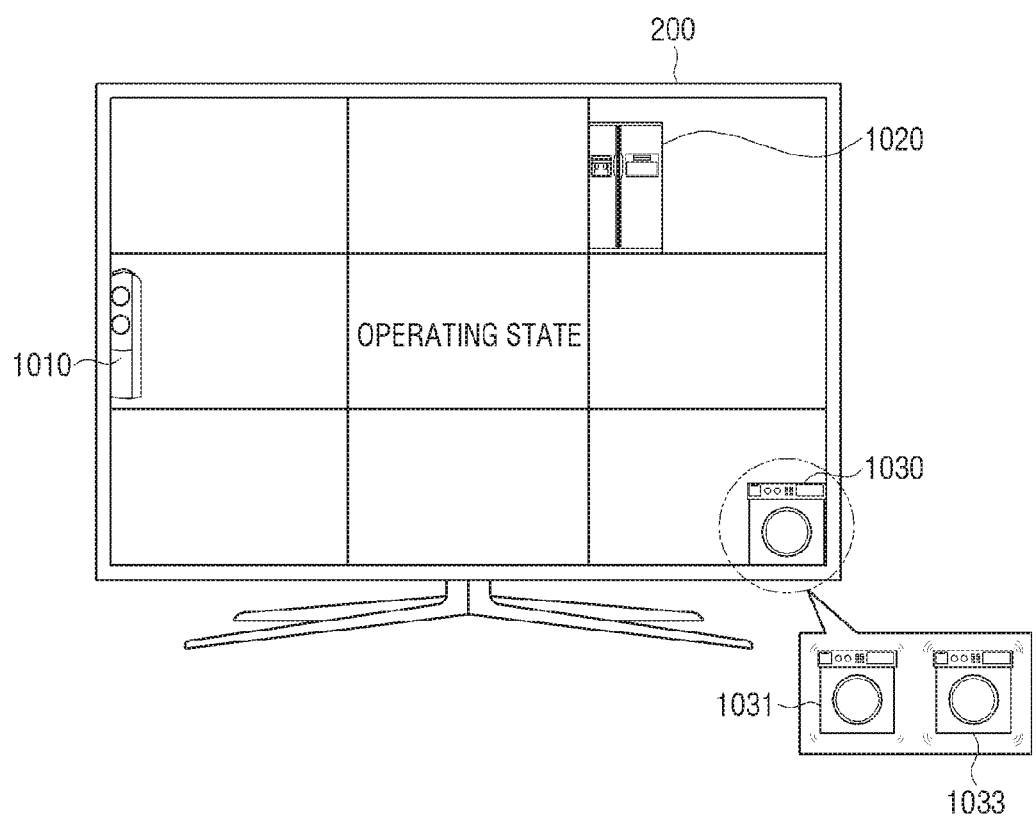
FIG. 10 is a diagram illustrating an example in which a display apparatus visually provides an operating state of a peripheral device to which a node terminal apparatus is attached, through a peripheral device UI, according to an exemplary embodiment.

FIG. 10 is a diagram illustrating an example in which the display apparatus 200 visually provides an operating state of a peripheral device to which the node terminal apparatus 100 is attached, through a peripheral device UI, according to an exemplary embodiment.

As illustrated in FIG. 10, the display apparatus 200 may display a control image UI image containing a UI element 1010 indicating a peripheral device of the air conditioner 10, a UI element 1020 indicating a peripheral device of the refrigerator 20, and a UI element 1030 indicating a peripheral device of the washing machine 30.

According to an exemplary embodiment, in response to sensing data from being received from the node terminal apparatus 100 attached to the washing machine 30 during display of the control image UI image, the display apparatus 200 may apply an animation effect to the UI element 1030 indicating a peripheral device of the washing machine 30 based on the received sensing data.

According to an exemplary embodiment, when the washing machine 30 performs rinse and spin operations, the washing machine 30 may generate different vibrations. Accordingly, the node terminal apparatus 100 attached to the washing machine 30 may sense the different vibration feedbacks from vibration generated according to each operation and transmit sensing data sensed according to each operation to the display apparatus 200.

In response to sensed sensing data being received from the vibration generated when the washing machine 30 performs a rinse operation, the display apparatus 200 may display a peripheral device UI image formed by applying an animation effect of low vibration to a UI element 1031 indicating a peripheral device of the washing machine 30 based on the received sensing data. In response to sensed sensing data being received from vibration generated when the washing machine 30 performs a spin operation, the display apparatus 200 may display a peripheral device UI image formed by applying an animation effect of high vibration to a UI element 1033 indicating a peripheral device of the washing machine 30 based on the received sensing data.

Therefore, a user may intuitively check an operating state of each peripheral device according to a guide message displayed in a region for displaying each UI element of the peripheral device UI image displayed on the display apparatus 200 or an animation effect applied to each UI element.

Below, an operation for providing a peripheral device UI image of the display apparatus 200 by the user terminal apparatus 400 will be described in more detail.

Figure 11:
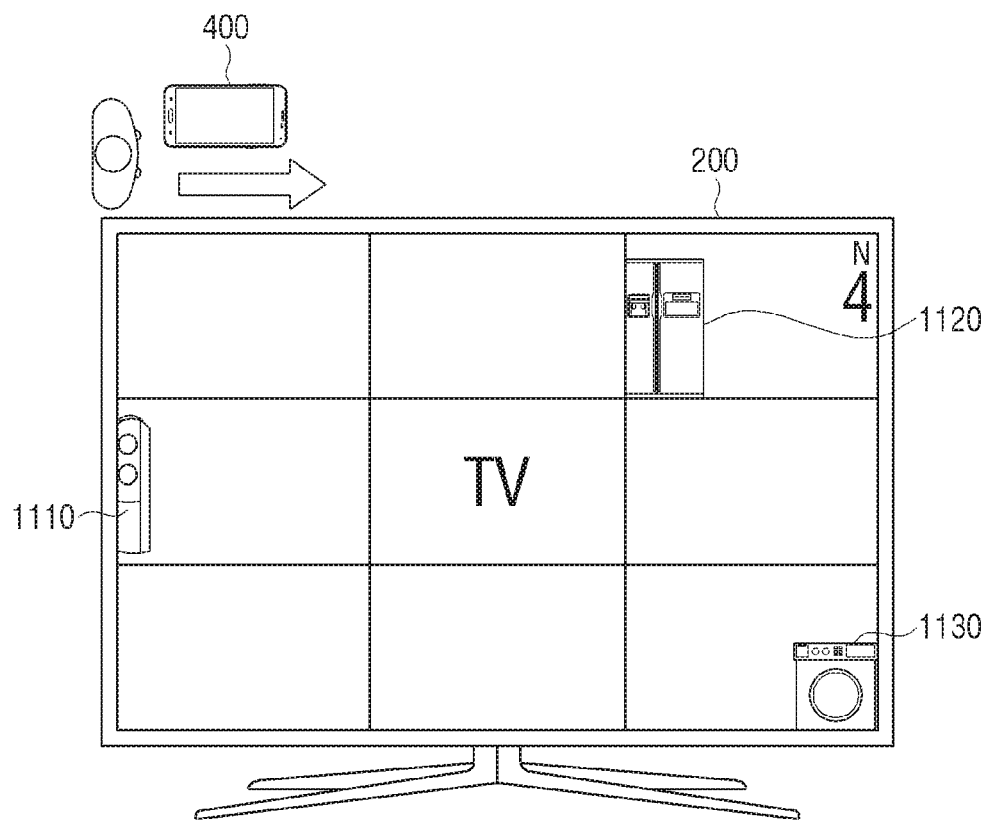
FIG. 11 is a diagram illustrating an example in which a display apparatus determines a position of a user terminal apparatus, according to an exemplary embodiment.
Figure 12A:
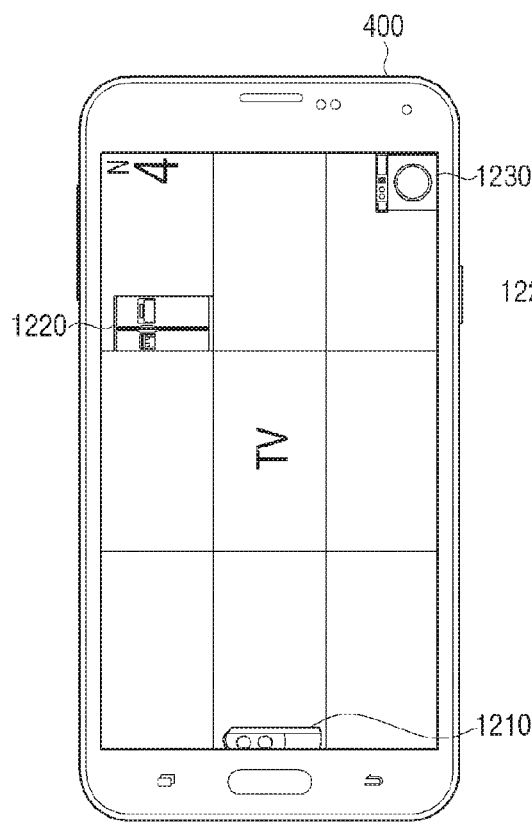
FIGS. 12A and 12B are diagrams illustrating an example in which a user terminal apparatus displays a peripheral device UI image, according to an exemplary embodiment.
Figure 12B:
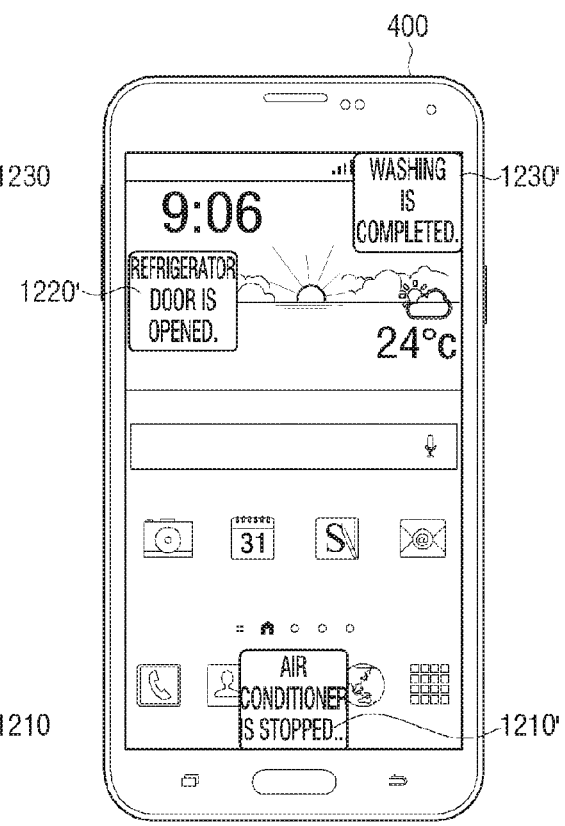

FIG. 11 is a diagram illustrating an example in which the display apparatus 200 determines a position of the user terminal apparatus 400 according to an exemplary embodiment. FIGS. 12A and 12B are diagrams illustrating an example in which the user terminal apparatus 400 displays a peripheral device UI image according to an exemplary embodiment.

As illustrated in FIG. 11, the display apparatus 200 may recognize the position of the user terminal apparatus 400 that is communicable (e.g., configured to communicate) with the display apparatus 200 on a virtual space corresponding to the peripheral device UI image.

The display apparatus 200 that is communicable with the user terminal apparatus 400 and the node terminal apparatus 100 attached to at least two peripheral devices may transmit a BT signal to the user terminal apparatus 400 according to request of the user terminal apparatus 400. Accordingly, in response to the BT signal being received from the display apparatus 200 and the node terminal apparatus 100 attached to at least two peripheral devices, the user terminal apparatus 400 may measure an intensity of each received BT signal using RSSI. Then the user terminal apparatus 400 may transmit signal information indicating an intensity value of a BT signal measured for each device and direction information about a direction indicated by the user terminal apparatus 400 to the display apparatus 200.

In response to the signal information and the direction information being received, the display apparatus 200 may recognize the position of the user terminal apparatus 400 with respect to the display apparatus 200 based on the received signal information and the position information of a peripheral device of each of at least two node terminal apparatuses 100 that transmit the BT signal to the user terminal apparatus 400. Here, the position information of the peripheral device, to which each of the at least two node terminal apparatuses 100 that transmits the BT signal is attached, may be pre-stored in the display apparatus 200 during an operation for registering a UI element corresponding to a peripheral device on a peripheral device UI image with regard to FIGS. 6A, 6B, and 7.

According to an exemplary embodiment, the display apparatus 200 may perform triangulation to recognize a position of the user terminal apparatus 400 with respect to the display apparatus 200 based on the signal information received from the user terminal apparatus 400 and the position information of the at least two node terminal apparatuses 100 that transmits the BT signal to the user terminal apparatus 400. Technologies for performing triangulation may be based on the signal information received from the user terminal apparatus 400 and the position information of the at least two node terminal apparatuses 100 that transmit the BT signal to the user terminal apparatus 400.

In response to the position of the user terminal apparatus 400 being recognized, the display apparatus 200 may generate a peripheral device UI formed by converting a UI element position of a UI element corresponding to each peripheral device based on the recognized position of the user terminal apparatus 400 and the direction information received from the user terminal apparatus 400 and transmit the peripheral device UI to the user terminal apparatus 400.

For example, the display apparatus 200 may determine that the user terminal apparatus 400 is positioned in a region ① among nine regions obtained by dividing an image with respect to the display apparatus 200. In addition, the display apparatus 200 may determine that the user terminal apparatus 400 is directed to an east direction based on the display apparatus 200.

According to an exemplary embodiment, the display apparatus 200 may convert a position of a UI element corresponding to each peripheral device contained in the peripheral device UI image based on the region in which the user terminal apparatus 400 is positioned and the direction to which the user terminal apparatus 400 is directed. That is, the display apparatus 200 may convert a UI element 1110 corresponding to a peripheral device of the air conditioner 10 displayed in a region ④ to be displayed in a bottom middle region of the user terminal apparatus 400. In addition, the display apparatus 200 may convert a UI element 1120 corresponding to a peripheral device of the refrigerator 20 displayed in a region ③ to be displayed in a top left region of the user terminal apparatus 400. In addition, the display apparatus 200 may convert a UI element 1130 corresponding to a peripheral device of the washing machine 30 displayed in a region ⑨ to be positioned in a top right region of the user terminal apparatus 400.

In response to the peripheral device UI image obtained by converting a position of each UI element being generated based on the position and direction of the user terminal apparatus 400, the display apparatus 200 may transmit the peripheral device UI image obtained by converting a position of each UI element to the user terminal apparatus 400.

Accordingly, as illustrated in FIG. 12A, the user terminal apparatus 400 may display a peripheral device UI image received from the display apparatus 200.

That is, the user terminal apparatus 400 may display a peripheral device UI image containing a UI element 1210 corresponding to a peripheral device of the air conditioner 10 in a bottom middle region, a UI element 1220 to a peripheral device of the refrigerator 20 in a top left region, and a UI element 1230 corresponding to a peripheral device of the washing machine 30 in a top right region based on the region and directed direction of the user terminal apparatus 400 with respect to the display apparatus 200.

In response to sensing data of a peripheral device being received from the node terminal apparatus 100 attached to each peripheral device during display of the peripheral device UI image, the user terminal apparatus 400 may display a message associated with sensing data in a region for displaying a UI element corresponding to a peripheral device, to which the node terminal apparatus 100 that transmits the sensing data is attached, among a plurality of UI elements.

As illustrated in FIG. 12B, the user terminal apparatus 400 may display a peripheral device UI image containing a message 1210' of 'Air conditioner is stopped.' in a region for displaying the air conditioner 10, a message 1220' of 'Refrigerator door is opened.' in a region for displaying the refrigerator 20, and a message 1230' of 'Washing is completed.' in a region for displaying the washing machine 30 according to the sensing data received from the node terminal apparatus 100 attached to each peripheral device.

Above, components of the node terminal apparatus 100 and the display apparatus 200 that constitute a peripheral device management system according to exemplary embodiments have been described in detail. Below, a method for managing a peripheral device in a peripheral device management system including the node terminal apparatus 100 and the display apparatus 200 according to exemplary embodiments will be described in detail.

FIG. 13 is a flowchart of a method for registering the node terminal apparatus 100 by the display apparatus 200 of a peripheral device management system according to an exemplary embodiment.

In response to an IR signal for pairing request being received from the node terminal apparatus 100 that is not registered in the display apparatus 200 (S1310), the display apparatus 200 may perform pairing with the node terminal apparatus 100 based on the received IR signal and register the paired node terminal apparatus 100 in the display apparatus 200 (S1320).

In response to pairing with the node terminal apparatus 100, the display apparatus 200 may display an operation guide message of the corresponding node terminal apparatus 100 (S1330). The operation guide message may be guide information for attaching the paired node terminal apparatus 100 to a peripheral device. Accordingly, the user may attach the node terminal apparatus 100 to the peripheral device according to the operation guide message displayed on a screen of the display apparatus 200.

Then the display apparatus 200 may receive sensing data obtained by sensing at least one of vibration feedback generated according to an operating state of a peripheral device to which the node terminal apparatus 100 is attached and event notification feedback from the node terminal apparatus 100 attached to the peripheral device (S1340). In response to the sensing data being received from the paired node terminal apparatus 100, the display apparatus 200 may transmit the received sensing data to the external server 300 (S1350). In response to device information containing identification information of the peripheral device, to which the node terminal apparatus 100 that transmits the sensing data is attached, and control information for each operating state, being received from the external server 300 (S1360), the display apparatus 200 may match and store terminal information of the node terminal apparatus 100 that transmits the sensing data and the device information of the external server 300 (S1370).

In response to the sensing data sensed according to an operating state of the peripheral device, to which the node terminal apparatus 100 is attached, being received from the paired node terminal apparatus 100, the display apparatus 200 may identify a peripheral device to which the node terminal apparatus 100 is attached from the terminal information of the node terminal apparatus 100 contained in the received sensing data and acquire device information of the corresponding peripheral device. Then the display apparatus 200 may extract sensing pattern information similar to the sensing data from the acquired device information and display a UI image indicating an operating state of a peripheral device based on the operating state information matched with the extracted sensing pattern information. In addition, the display apparatus 200 may transmit control information for control of an operation of a peripheral device, which is matched and stored with the acquired operating state information with regard to the sensing data, to the node terminal apparatus 100. Accordingly, the node terminal apparatus 100 may control an operation of the peripheral device to which the node terminal apparatus 100 is attached, based on the control information received from the display apparatus 200.

FIG. 14 is a flowchart of a method for managing a peripheral device to which the node terminal apparatus 100 is attached, by the display apparatus 200 according to an exemplary embodiment.

As illustrated in FIG. 14, the display apparatus 200 may sense an operating state of a corresponding peripheral device from the node terminal apparatus 100 attached to the peripheral device and receive the sensed sensing data (S1410). In response to the sensing data being received, the display apparatus 200 may analyze the received sensing data (S1420) and display a UI image indicating an operating state of the peripheral device to which the node terminal apparatus 100 is attached (S1430). Then the display apparatus 200 may transmit the control information for control of the peripheral device with regard to the operating state of the corresponding peripheral device to the node terminal apparatus 100 (S1440). Accordingly, the node terminal apparatus 100 may control an operation of the peripheral device to which the node terminal apparatus 100 is attached, based on the control information received from the display apparatus 200.

According to an exemplary embodiment, in response to the sensing data sensed according to the operating state of the peripheral device being received from the node terminal apparatus 100 attached to the peripheral device, the display apparatus 200 may identify the peripheral device to which the node terminal apparatus 100 is attached, based on terminal information contained in the received sensing data. The display apparatus 200 may acquire the device information contained in the received sensing data from pre-stored device information for each of a plurality of peripheral devices and identify a peripheral device to which the node terminal apparatus 100 is attached. Here, the device information of the peripheral device may include at least one of manufacturer information, identification (model) information of a peripheral device, sensing pattern information generated according to each operating state of the corresponding peripheral device, operating state information corresponding to the sensing pattern information, and control information for control of a peripheral device for each operating state. Here, at least two of the sensing pattern information generated according to an operating state, the operating state information, and the control information may be matched with each other.

According to an exemplary embodiment, in response to the device information of the identified peripheral device being acquired, the display apparatus 200 may compare the received sensing data and sensing pattern information contained in the device information to acquire sensing pattern information similar to the sensing data. Then the display apparatus 200 may acquire at least one of control information and the operating state information matched with the sensing pattern information from the acquired sensing pattern information.

In response to the operating state information of the peripheral device acquired with regard to the received sensing data, the display apparatus 200 may display a UI image indicating the operating state of the node terminal apparatus 100 that transmits the sensing data, based on the acquired operating state information. In addition, the display apparatus 200 may transmit the control information acquired with regard to the received sensing data to the node terminal apparatus 100 that transmits the sensing data. Accordingly, the node terminal apparatus 100 may control an operation of the peripheral device to which the node terminal apparatus 100 is attached, based on the control information received from the display apparatus 200.

A UI indicating the operating state of the aforementioned peripheral device may be a peripheral device UI containing UI elements respectively corresponding to pre-registered peripheral devices. Accordingly, the display apparatus 200 may display the peripheral device UI image containing the UI elements respectively corresponding to pre-registered peripheral devices. In response to sensing data of the corresponding peripheral device being received from the node terminal apparatus 100 attached to the pre-registered peripheral device during display of the peripheral device UI image, the display apparatus 200 may visually display an event occurrence situation associated with the sensing data, in a region for displaying an UI element corresponding to a peripheral device, to which the node terminal apparatus 100 that transmits the sensing data is attached, among a plurality of UI elements.

According to an exemplary embodiment, in response to sensing data of a corresponding peripheral device being received from the node terminal apparatus 100 attached to the pre-registered peripheral device, the display apparatus 200 may display, with an animation effect, an operating state of the peripheral device associated with the received sensing data on a UI element corresponding to the peripheral device, to which the node terminal apparatus 100 that transmits the sensing data is attached.

According to another exemplary embodiment, in response to the sensing data of the corresponding peripheral device being received from the node terminal apparatus 100 attached to the pre-registered peripheral device, the display apparatus 200 may display the operating state of the peripheral device associated with the received sensing data in the form of a popup message around a UI element corresponding to the peripheral device, to which the node terminal apparatus 100 that transmits the sensing data is attached.

According to an exemplary embodiment, a UI containing an operating state of a peripheral device may be a message UI for guiding the operating state of the peripheral device to which the node terminal apparatus 100 is attached. In this case, in response to the sensing data being received from the node terminal apparatus 100 during display of image content, the display apparatus 200 may display a message UI associated with the operating state of the peripheral device associated with the received sensing data on a screen image for displaying image content.

According to an exemplary embodiment, in response to sensing data being received from the node terminal apparatus 100 during display of image content, the display apparatus 200 may identify a peripheral device to which the node terminal apparatus 100 is attached, based on terminal information contained in the received sensing data. The display apparatus 200 may acquire operating state information of the corresponding peripheral device based on the device information of the identified peripheral device and the received sensing data and display a message UI indicating an operating state of the peripheral device on a screen image for displaying image content based on the acquired operating state information. Accordingly, the display apparatus 200 may display a message UI indicating the operating state of the peripheral device on a screen image for displaying the image content to overlap on an image for displaying image content.

According to another exemplary embodiment, in response to sensing data from being received from the node terminal apparatus 100 during display of image content, the display apparatus 200 may perform the aforementioned series of operations to acquire operating state information of the identified peripheral device. Then the display apparatus 200 may display a message UI associated with pre-acquired operating state information in the form of popup on a region for displaying a UI element corresponding to a peripheral device, to which the node terminal apparatus 100 that transmits sensing data is attached, from regions for displaying image content.

The display apparatus 200 may visually provide the operating state of the peripheral device, to which the corresponding node terminal apparatus 100 is attached, on a peripheral device UI image or a screen image for displaying image content, based on the sensing data received from the node terminal apparatus 100 such that a user intuitively checks a current operating state of each peripheral device through the display apparatus 200.

Figure 15:
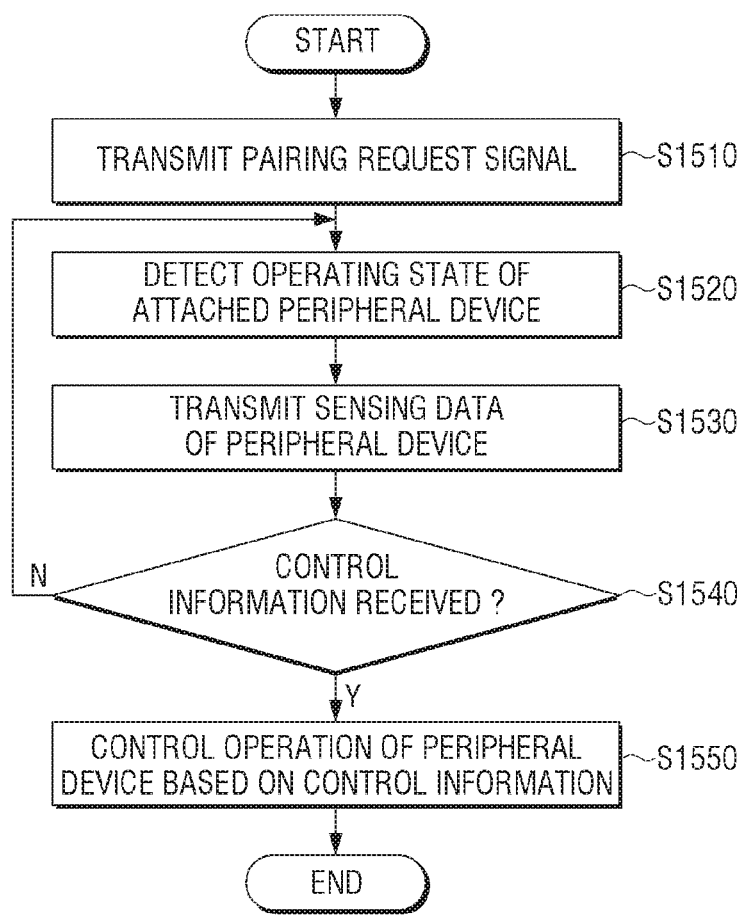
FIG. 15 is a flowchart of a method for controlling a node terminal apparatus attached to a peripheral device, according to an exemplary embodiment.

FIG. 15 is a flowchart of a method for controlling the node terminal apparatus 100 attached to a peripheral device, according to an exemplary embodiment.

As illustrated in FIG. 15, in response to an initial power on command being input or a user command for pairing request being input, the node terminal apparatus 100 may transmit an IR signal for pairing with the display apparatus 200 (S1510). When paired with the display apparatus 200 and then attached to a peripheral device, the node terminal apparatus 100 may sense at least one of vibration feedback generated according to an operating state of the attached peripheral device and event notification feedback (S1520). Then the node terminal apparatus 100 may transmit operating state information containing the sensed sensing data to the display apparatus 200 (S1530).

Then the node terminal apparatus 100 may determine whether control information of the peripheral device to which the node terminal apparatus 100 is attached, from the display apparatus 200 that transmits the operating state information (S1540). According to the determination result, in response to the control information of the peripheral device being received, the node terminal apparatus 100 may control an operation of the peripheral device to which the node terminal apparatus 100 is attached, based on the received control information (S1550). In response to the control information of the peripheral device being received from the display apparatus 200, the node terminal apparatus 100 may transmit an IR signal for control of an operation of the peripheral device, to which the node terminal apparatus 100 is attached, to the peripheral device based on the received control information. Accordingly, the peripheral device may perform an operation corresponding to the IR signal received from the node terminal apparatus 100.

Below, a method for adding a UI element corresponding to a newly registered peripheral device to a peripheral device UI by the display apparatus 200 will be described in detail.

Figure 16:
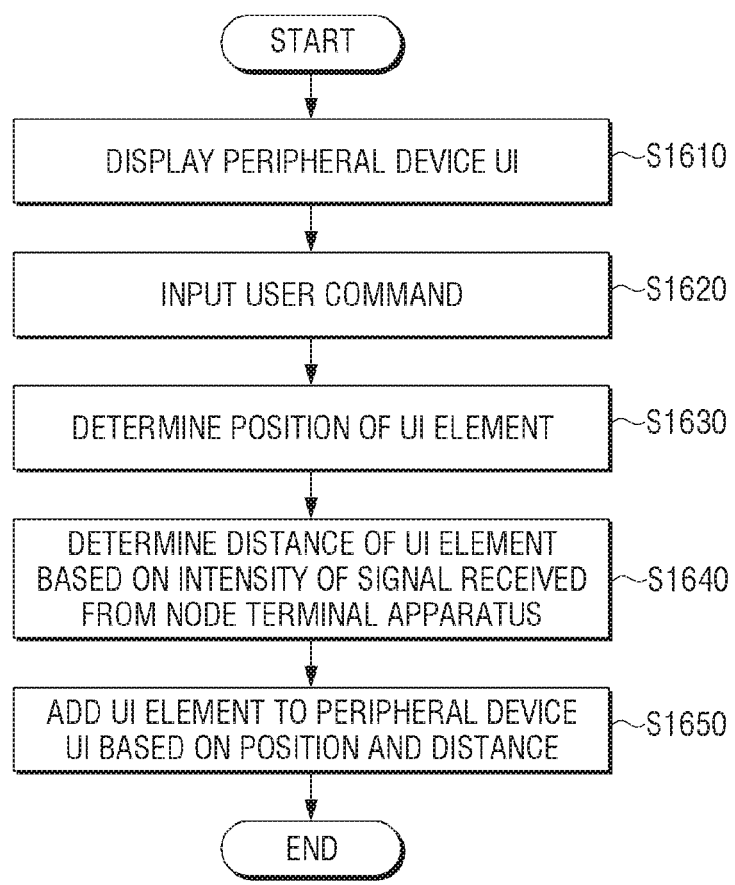
FIG. 16 is a flowchart of a method for adding a UI element corresponding to a peripheral device to a peripheral device UI by a display apparatus according to an exemplary embodiment.

FIG. 16 is a flowchart of a method for adding a UI element corresponding to a peripheral device to a peripheral device UI by the display apparatus 200 according to an exemplary embodiment.

When a peripheral device and the node terminal apparatus 100 attached to the peripheral device are registered via an exemplary operation of FIG. 13, the display apparatus 200 may display a peripheral device UI image containing a UI element corresponding to a pre-stored peripheral device according to a user command (S1610).

In response to a user command for adding a UI element corresponding to a newly-registered peripheral device onto a peripheral device UI image being input during display of the peripheral device UI image (S1620), a region of a peripheral device UI region, corresponding to the user command, may be determined as a position of a UI element corresponding to the newly registered peripheral device (S1630).

The display apparatus 200 may determine a relative distance between a UI element corresponding to a corresponding peripheral device and the display apparatus 200, based on intensity of a signal received from the node terminal apparatus 100 attached to the newly registered peripheral device (S1640). The signal received from the node terminal apparatus 100 may be a BT signal and may be received from the node terminal apparatus 100 or received according to a request of the display apparatus 200 during an operation for registering an initial peripheral device.

The display apparatus 200 may add a UI element corresponding to the newly registered peripheral device to the peripheral device UI image and display the peripheral device UI image, based on the position and distance of the UI element corresponding to the newly registered peripheral device (S1650).

According to an exemplary embodiment, in response to sensing data being received from the node terminal apparatus 100 during display of a peripheral device UI image containing a UI element corresponding to each pre-registered peripheral device, the display apparatus 200 may display an operating state of the peripheral device on a UI element corresponding to a peripheral device to which the node terminal apparatus 100 is attached, based on the received sensing data.

Below, a method for providing a peripheral device UI displayed by the display apparatus 200 through the user terminal apparatus 400 communicable with the display apparatus 200 will be described in detail.

Figure 17:
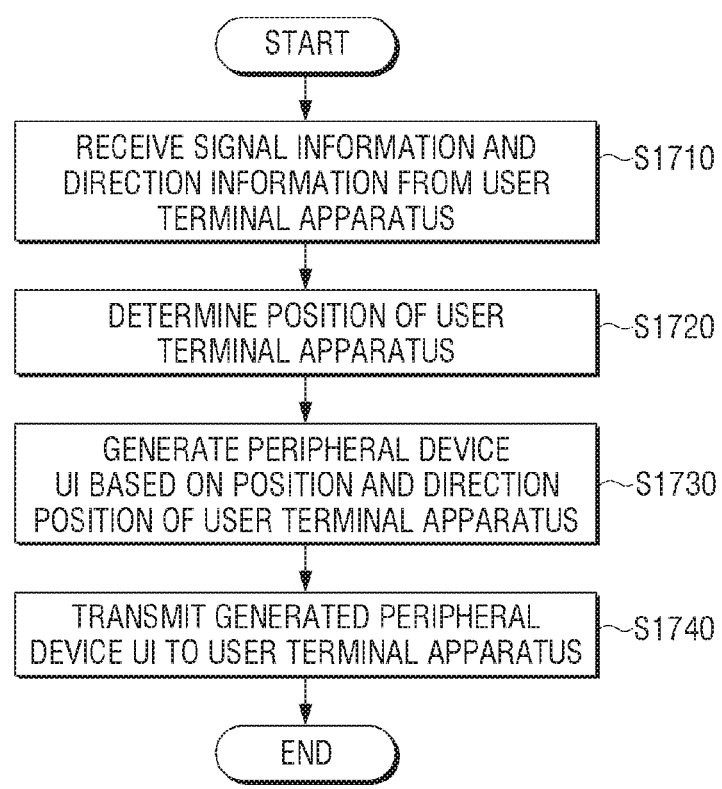
FIG. 17 is a flowchart of a method for providing a peripheral device UI to a user terminal apparatus by a display apparatus according to an exemplary embodiment.

FIG. 17 is a flowchart of a method for providing a peripheral device UI to the user terminal apparatus 400 by the display apparatus 200 according to an exemplary embodiment.

As illustrated in FIG. 17, the display apparatus 200 may receive information of a signal from the user terminal apparatus 400 communicable with the display apparatus 200 and direction information of a direction indicated by the user terminal apparatus 400 (S1710). Here, the signal information may be information indicating a signal intensity value of a BT signal measured for each device.

The display apparatus 200 communicable with the user terminal apparatus 400 and the node terminal apparatus 100 attached to at least two peripheral devices may transmit a BT signal to the user terminal apparatus 400 according to request of the user terminal apparatus 400. Accordingly, in response to the BT signal being received from the display apparatus 200 and the node terminal apparatus 100 attached to at least two peripheral devices, the user terminal apparatus 400 may measure intensity of each received BT signal using RSSI. The user terminal apparatus 400 may transmit signal information indicating an intensity value of the BT signal measured for each device and direction information of a direction indicated by the user terminal apparatus 400 to the display apparatus 200.

In response to the signal information and the direction information being received, the display apparatus 200 may determine a position of the user terminal apparatus 400 with respect to the display apparatus 200 based on the received signal information and position information of a peripheral device, to which each of the at least two node terminal apparatuses 100 that transmit the BT signal is attached (S1720).

The display apparatus 200 may generate a peripheral device UI obtained by converting a position of a UI element corresponding to each peripheral device based on a pre-determined position of the user terminal apparatus 400 and the direction information received from the user terminal apparatus 400 (S1730) and transmit the generated peripheral device UI to the user terminal apparatus 400 (S1740).

Accordingly, the user terminal apparatus 400 may display the peripheral device UI image received from the display apparatus 200. A process performed according to an exemplary embodiment may be stored in the form of a program in a non-transitory computer readable medium, and the non-transitory computer readable medium may be a medium which does not store data temporarily such as a register, cash, and memory but stores data semi-permanently and is readable by devices. Also, the aforementioned applications or programs may be stored in the non-transitory computer readable media such as compact disks (CDs), digital video disks (DVDs), hard disks, Blu-ray disks, universal serial buses (USBs), memory cards, and read-only memory (ROM).

The foregoing exemplary embodiments are merely exemplary and are not to be construed as limiting the present disclosure. The present teaching can be readily applied to other types of apparatuses. Also, the description of exemplary embodiments is intended to be illustrative, and not to limit the scope of the claims, and many alternatives, modifications, and variations will be apparent to those skilled in the art.

What is claimed is:

1. A system comprising:
   a node terminal apparatus attached to a peripheral device and configured to sense vibration feedback or audio feedback according to an operating state of the peripheral device using a sensor, and generate sensing data based on the sensed vibration feedback or the sensed audio feedback; and
   a display apparatus configured to, in response to the sensing data being received from the node terminal apparatus, acquire device information related to the received sensing data from pre-stored device information, and display a user interface (UI) indicating the operating state of the peripheral device based on the acquired device information,
   wherein the peripheral device is incapable of communicating with the display apparatus and the node terminal apparatus is capable of communicating with the display apparatus,
   wherein the device information includes information of a plurality of feedbacks generated according to an operation of the peripheral device,
   wherein the display apparatus is further configured to:
      compare the vibration feedback or the audio feedback, and the plurality of feedbacks included in the device information,
      identify the operating state of the peripheral device based on a result of the comparison,
      transmit, if the device information related to the sensing data is not stored, the sensing data to an external server, and
      store, in response to the device information related to the sensing data being received from the external server, the received device information, and
   wherein the node terminal apparatus is attachable to and detachable from a surface of the peripheral device.

2. The system as claimed in claim 1, wherein the display apparatus is further configured to perform pairing with the node terminal apparatus according to a pairing request received from the node terminal apparatus and, in response to the sensing data of the peripheral device being received from the paired node terminal apparatus.

3. The system as claimed in claim 2, wherein:
   the UI is a peripheral device UI comprising a UI element corresponding to at least one peripheral device; and the display apparatus is configured to add a UI element corresponding to a peripheral device that is registered in the display apparatus to the peripheral device UI and display the peripheral device UI with a position of the UI element based on a relative distance between the registered peripheral device and the display apparatus.

4. The system as claimed in claim 3, wherein the display apparatus is further configured to determine the position of the UI element corresponding to the peripheral device registered in the peripheral device UI according to a user command, and determine the relative distance of the UI element of the peripheral device registered in the peripheral device UI based on a signal intensity of the node terminal apparatus attached to the registered peripheral device.

5. The system as claimed in claim 3, wherein the display apparatus is further configured to display the operating state of the peripheral device on the UI element corresponding to the peripheral device with the node terminal apparatus attached to it.

6. The system as claimed in claim 5, wherein the display apparatus is further configured to display, with an animation effect, the operating state of the peripheral device on the UI element corresponding to the peripheral device with the node terminal apparatus attached to it, or display the operating state as a message popup near the UI element corresponding to the peripheral device with the node terminal apparatus attached to it.

7. The system as claimed in claim 1, wherein:
the UI is a message UI for guiding a user about the operating state of the peripheral device with the node terminal apparatus attached to it; and
the display apparatus is further configured to, in response to the sensing data being received from the node terminal apparatus during displaying of image content, display, on the image content, the message UI for guiding the operating state determined based on the received sensing data.

8. The system as claimed in claim 7, wherein the message UI is displayed as a popup in a region for displaying a UI element corresponding to the peripheral device with the node terminal apparatus attached to it.

9. The system as claimed in claim 3, wherein the display apparatus is further configured to determine a position of a user terminal apparatus configured to communicate with the display apparatus on the peripheral device UI, change a peripheral device UI comprising a UI element corresponding to the at least one peripheral device to correspond to a screen of the user terminal apparatus based on the determined position of the user terminal apparatus and a direction in which the user terminal apparatus is moving, and transmit the peripheral device UI to the user terminal apparatus.

10. The system as claimed in claim 1, wherein:
the display apparatus is further configured to transmit control information corresponding to the operating state of the peripheral device determined based on the sensing data to the node terminal apparatus; and
the node terminal apparatus is further configured to control an operation of the peripheral device with the node terminal apparatus attached to it based on the control information received from the display apparatus.

11. A method for managing a peripheral device, the method comprising:
sensing vibration feedback or audio feedback according to an operating state of a peripheral device to generate sensing data based on the vibration feedback or the audio feedback by a node terminal apparatus attached to the peripheral device;
obtaining the operating state of the peripheral device using the sensing data and transmitting the generated sensing data to a display apparatus by the node terminal apparatus;
in response to the sensing data being received by the display apparatus from the node terminal apparatus, acquiring device information related to the received sensing data from pre-stored device information, the device information includes information of a plurality of feedbacks generated according to an operation of the peripheral device
comparing the vibration feedback or the audio feedback, and the plurality of feedbacks included in the device information,
identifying the operating state of the peripheral device based on a result of the comparison,
displaying a user interface (UI) indicating the operating state of the peripheral device, and
transmitting, if the device information related to the sensing data is not stored, the sensing data to an external server; and
storing, in response to the device information related to the sensing data being received from the external server, the received device information in the display apparatus,
wherein the peripheral device is incapable of communicating with the display apparatus and the node terminal apparatus is capable of communicating with the display apparatus, and
wherein the node terminal apparatus is attachable to and detachable from a surface of the peripheral device.

12. The method as claimed in claim 11, further comprising:
performing pairing with the node terminal apparatus according to a pairing request received from the node terminal apparatus by the display apparatus; and
in response to the sensing data of the peripheral device being received from the paired node terminal apparatus.

13. The method as claimed in claim 12, wherein:
the UI is a peripheral device UI comprising a UI element corresponding to at least one peripheral device; and
the displaying comprises adding a UI element corresponding to a peripheral device that is registered in the display apparatus to the peripheral device UI and displaying the peripheral device UI.

14. The method as claimed in claim 13, further comprising:
determining a position of the UI element corresponding to the peripheral device registered in the peripheral device UI according to a user command; and
determining a relative distance of the UI element of the peripheral device registered in the peripheral device UI based on a signal intensity of the node terminal apparatus attached to the registered peripheral device,
wherein the displaying comprises adding a UI element corresponding to the registered peripheral device to the peripheral device UI and displaying the peripheral device UI based on a position and the determined relative distance of the UI element.

15. The method as claimed in claim 13, wherein the displaying comprises displaying the operating state of the peripheral device on a UI element corresponding to a peripheral device with the node terminal apparatus attached to it.

16. The method as claimed in claim 15, wherein the displaying comprises displaying, with an animation effect, the operating state of the peripheral device on the UI element corresponding to the peripheral device with the node terminal apparatus attached to it, or displaying the operating state as a message popup near the UI element corresponding to the peripheral device with the node terminal apparatus attached to it.

17. The method as claimed in claim 11, wherein:
the UI is a message UI for guiding a user about the operating state of the peripheral device with the node terminal apparatus attached to it; and
the displaying comprises, in response to the sensing data being received from the node terminal apparatus during display of image content, displaying, on the image content, the message UI for guiding the operating state determined based on the received sensing data.

18. The method as claimed in claim 17, wherein the message UI is displayed as a popup in a region for displaying a UI element corresponding to the peripheral device with the node terminal apparatus attached to it.

19. The method as claimed in claim 13, further comprising determining a position of a user terminal apparatus that communicates with the display apparatus, changing a peripheral device UI comprising a UI element corresponding to the at least one peripheral device to correspond to a screen of the user terminal apparatus based on the determined position of the user terminal apparatus and a direction in which the user terminal apparatus is moving, and transmitting the peripheral device UI to the user terminal apparatus, according to a user command, by the display apparatus.

20. The method as claimed in claim 11, further comprising:
transmitting control information corresponding to the operating state of the peripheral device determined based on the sensing data to the node terminal apparatus by the display apparatus; and
controlling an operation of the peripheral device with the node terminal apparatus attached to it based on the control information received from the display apparatus by the node terminal apparatus.

21. A display apparatus comprising:
a communication interface configured to communicate with a node terminal apparatus that is attachable to and detachable from a surface of a peripheral device;
a display configured to display a user interface (UI); and
a processor configured to:
control the communication interface to receive sensing data, based on a sensed vibration feedback or a sensed audio feedback, from the node terminal apparatus;
in response to the sensing data being received from the node terminal apparatus, acquire device information related to the received sensing data from pre-stored device information, the device information includes information of a plurality of feedbacks generated according to an operation of the peripheral device,
compare the vibration feedback or the audio feedback, and the plurality of feedbacks included in the device information,
identify an operating state of the peripheral device based on a result of the comparison,
display a user interface (UI) indicating the operating state of the peripheral device;
transmit, if the device information related to the sensing data is not stored, the sensing data to an external server, and
store, in response to the device information related to the sensing data being received from the external server, the received device information,
wherein the peripheral device is incapable of communicating with the display apparatus and the node terminal apparatus is capable of communicating with the display apparatus.

22. The display apparatus of claim 21, wherein the UI comprises a plurality of UI elements displayed according to a relative position between the display apparatus and the peripheral device with the node terminal apparatus attached to it.

* * * * *